US 11,689,956 B2

(12) United States Patent
Li et al.

(10) Patent No.: US 11,689,956 B2
(45) Date of Patent: Jun. 27, 2023

(54) RELOCATION METHOD AND APPARATUS

(71) Applicant: HUAWEI TECHNOLOGIES CO., LTD., Guangdong (CN)

(72) Inventors: Yongcui Li, Beijing (CN); Yan Li, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 17/034,618

(22) Filed: Sep. 28, 2020

(65) Prior Publication Data

US 2021/0014720 A1    Jan. 14, 2021

Related U.S. Application Data

(63) Continuation of application No. PCT/CN2019/078212, filed on Mar. 15, 2019.

(30) Foreign Application Priority Data

Mar. 30, 2018   (CN) .......................... 201810291695.1

(51) Int. Cl.
*H04W 28/02*   (2009.01)
*H04W 28/08*   (2023.01)
(Continued)

(52) U.S. Cl.
CPC ......... *H04W 28/0226* (2013.01); *H04W 8/08* (2013.01); *H04W 28/0875* (2020.05); *H04W 48/16* (2013.01)

(58) Field of Classification Search
CPC .............. H04M 15/66; H04L 12/1407; H04L 2101/659; H04L 61/5007; H04L 67/14;
(Continued)

(56) References Cited

U.S. PATENT DOCUMENTS

2017/0339609 A1* 11/2017 Youn ..................... H04W 76/11
2018/0027521 A1    1/2018 Kim et al.
(Continued)

FOREIGN PATENT DOCUMENTS

| CN | 101534493 A | 9/2009 |
|---|---|---|
| CN | 107787010 A | 3/2018 |
| WO | 2018006017 A1 | 1/2018 |

OTHER PUBLICATIONS

3GPP TS 23.502 V15.1.0 (Mar. 2018), "3rd Generation Partnership Project; Technical Specification Group Services and System Aspects; Procedures for the 5G System; Stage 2 (Release 15)," Mar. 2018, 285 pages.
(Continued)

*Primary Examiner* — Joseph E Avellino
*Assistant Examiner* — Mon Cheri S Davenport
(74) *Attorney, Agent, or Firm* — Fish & Richardson P.C.

(57) ABSTRACT

A method includes: receiving, by a session management function (SMF) network element, identification information from an access and mobility management function (AMF) network element; obtaining, by the SMF network element, information about a plurality of anchor user plane function (UPF) network elements of a session based on the identification information, wherein each of the plurality of anchor UPF network elements is used as an Internet protocol (IP) anchor of a user equipment in the session; and sending, by the SMF network element, the information to a branching point, wherein the branching point is a UPF network element managed by the SMF network element and the branching point is capable of diverting traffic.

20 Claims, 10 Drawing Sheets

(51) Int. Cl.
*H04W 8/08* (2009.01)
*H04W 48/16* (2009.01)

(58) Field of Classification Search
CPC ..... H04L 65/40; H04L 67/141; H04L 67/148; H04L 69/322; H04W 36/0011; H04W 36/12; H04W 48/16; H04W 76/12; H04W 8/08; H04W 92/24; H04W 80/10; H04W 76/11; H04W 36/22; H04W 36/08; H04W 36/32; H04W 28/10; H04W 40/22; H04W 36/0027; H04W 8/14
See application file for complete search history.

(56) References Cited

U.S. PATENT DOCUMENTS

| | | | |
|---|---|---|---|
| 2020/0252813 A1* | 8/2020 | Li | G06Q 20/382 |
| 2021/0315054 A1* | 10/2021 | Yang | H04W 76/12 |

OTHER PUBLICATIONS

3GPP TS 23.501 V15.1.0 (Mar. 2018), "3rd Generation Partnership Project;Technical Specification Group Services and System Aspects; System Architecture for the 5G System; Stage 2 (Release 15)," Mar. 2018, 201 pages.

Huawei, HiSilicon, "TS 23.502: Update on UPF relocation for UE during Service Request," SA WG2 Meeting #122, S2-174819, San Jose Del Cabo, Mexico, Jun. 26-30, 2017, 10 pages.

Huawei, HiSilicon, "Update to procedures to support service continuity in ULCL scenario," SA WG2 Meeting #123, S2-177429, Ijubljana, Slovenia, Oct. 23-27, 2017, 5 pages.

PCT International Search Report and Written Opinion issued in International Application No. PCT/CN2019/078212 dated May 27, 2019, 18 pages (with English translation).

ZTE, Intel, "TS 23.502 Session and Service Continuity," SA WG2 Meeting #122 Emeeting, S2-176803, Elbonia, Sep. 11-16, 2017, 12 pages.

Office Action issued in Chinese Application No. 201810291695.1 dated Feb. 18, 2021, 6 pages.

* cited by examiner

RELOCATION METHOD AND APPARATUS

CROSS-REFERENCE TO RELATED APPLICATIONS

This application is a continuation of International Patent Application No. PCT/CN2019/078212, filed on Mar. 15, 2019, which claims priority to Chinese Patent Application No. 201810291695.1, filed on Mar. 30, 2018. The disclosures of the aforementioned applications are hereby incorporated by reference in their entireties.

TECHNICAL FIELD

The present invention relates to the field of communications technologies, and in particular, to a relocation method and apparatus.

BACKGROUND

In a fifth-generation (the 5th-Generation, 5G) mobile communications technology, a concept of a service area of a session management function (session management function, SMF) network element is proposed. In other words, the SMF network element manages only a user plane function (user plane function, UPF) network element in the service area. In different areas, user equipment may access a data network (Data Network, DN) by using different UPF network elements, and the different UPF network elements may also be managed by different SMF network elements. For example, the user equipment establishes a first session in a first area, and manages a UPF network element in the first area by using a first SMF network element, to implement a user plane connection in the first area. Then, after the user equipment moves to a second area, a second SMF network element is inserted, and a UPF network element and a branching point in the second area that are managed by the second SMF network element are inserted, to implement a user plane connection between the second area and the first area. When the user equipment continues to move to a third area from the second area, the user equipment performs SMF network element relocation. To be specific, the user equipment selects a third SMF network element, and separately implements a user plane connection between the third area and the second area and a user plane connection between the third area and the first area by using the third SMF network element, so that the first session is not interrupted in a moving process of the user equipment.

Therefore, when the user equipment continues to move to the third area from the second area, and moves to another area from the third area, how to ensure that the first session is not interrupted by performing SMF network element relocation becomes a problem that is urgently to be resolved currently.

SUMMARY

Embodiments of the present invention provide a relocation method and apparatus.

According to an aspect, an embodiment of this application provides a relocation method. The method includes: A first session management function network element (for example, the first SMF network element) receives first identification information from an access and mobility management function network element (for example, the AMF network element). The first session management function network element obtains information about a plurality of anchor user plane function network elements (for example, the anchor UPF network elements) of a first session based on the first identification information. The first session management function network element sends the information about the plurality of anchor user plane function network elements to a branching point. The branching point is a user plane function network element that is managed by the first session management function network element and that has a function of diverting traffic.

According to the foregoing method, after establishing the first session in an area 1, user equipment moves to an area 2, and continues to move to another area from the area 2. In this case, the first SMF network element (namely, a target SMF network element) obtains information about a plurality of anchor UPF network elements in an area accessed by the user equipment, and delivers the information about the plurality of anchor UPF network elements to the branching point managed by the first SMF network element, so that the branching point can obtain the information about the plurality of anchor UPF network elements. A user plane connection between the branching point and each of the plurality of anchor UPF network elements is established in a target area to which the user equipment moves, to ensure that the first session is not interrupted after the user equipment moves. This improves user experience.

In a possible design, the first session management function network element is a target session management function network element in a session management function network element relocation process, and the first identification information includes an identifier of a source session management function network element (for example, the source SMF network element) in the session management function network element relocation process. In this case, the target SMF network element may obtain the identifier of the source SMF network element by using the AMF network element.

In a possible design, the first session management function network element receives, from the source session management function network element, identification information of a plurality of session management function network elements that manage the plurality of anchor user plane function network elements. The first session management function network element separately receives the information about the plurality of anchor user plane function network elements from the plurality of session management function network elements. In this case, the target SMF network element may obtain the identifier of the source SMF network element by using the AMF network element, receive identifiers of the plurality of SMF network elements from the source SMF network element, and separately receive the information about the plurality of anchor UPF network elements from the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the first session management function network element receives the information about the plurality of anchor user plane function network elements from the source session management function network element. In this case, the target SMF network element may obtain the identifier of the source SMF network element by using the AMF network element, and then receive the information about the plurality of anchor UPF network elements of the first session from the source SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the first identification information includes identification information of a plurality of session management function network elements that manage the plurality of anchor user plane function network elements. In this case, the target SMF network element may obtain identifiers of the plurality of SMF network elements by using the AMF network element.

In a possible design, the first session management function network element separately receives the information about the plurality of anchor user plane function network elements from the plurality of session management function network elements. In this case, the target SMF network element may obtain identifiers of the plurality of SMF network elements by using the AMF network element, and then separately receive, from the plurality of SMF network elements, the information about the plurality of anchor UPF network elements that are managed by the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the first identification information includes identification information of an anchor session management function network element that provides a session management service for the first session when the first session is established. In this case, the target SMF network element may obtain an identifier of the anchor SMF network element by using the AMF network element.

In a possible design, the first session management function network element receives, from the anchor session management function network element, identification information of a plurality of session management function network elements that manage the plurality of anchor user plane function network elements. The first session management function network element separately receives the information about the plurality of anchor user plane function network elements from the plurality of session management function network elements. In this case, the target SMF network element may obtain the identifier of the anchor SMF network element by using the AMF network element, receive an identifier of a source SMF network element from the anchor SMF network element, and separately receive the information about the plurality of anchor UPF network elements from the source SMF network element and the anchor SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the first session management function network element receives the information about the plurality of anchor user plane function network elements from the anchor session management function network element. In this case, the target SMF network element may obtain the identifier of the anchor SMF network element by using the AMF network element, and then receive the information about the plurality of anchor UPF network elements of the first session from the anchor SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the method further includes: The first session management function network element obtains an offload policy of the first session based on the first identification information. The first session management function network element sends the offloading policy to the branching point. In this way, after obtaining the offloading policy, the target SMF network element may control, based on the offloading policy, a service flow to be transmitted on a user plane path.

According to another aspect, this application further discloses a relocation method. The method includes: A second session management function network element (for example, the second SMF network element) obtains identification information of a plurality of session management function network elements that manage a plurality of anchor user plane function network elements of a first session. The second session management function network element sends the identification information of the plurality of session management function network elements to a first session management function network element (for example, the first SMF network element or a target SMF network element). The identification information of the plurality of session management function network elements is used to obtain information about the plurality of anchor user plane function network elements. The information about the plurality of anchor user plane function network elements is used to establish a connection between a branching point and each of the plurality of anchor user plane function network elements. The branching point is a user plane function network element that is managed by the first session management function network element and that has a function of diverting traffic.

According to the foregoing method, after establishing the first session in an area 1, user equipment moves to an area 2, and continues to move to another area from the area 2. In this case, the second SMF network element sends the identification information of the plurality of SMF network elements to the target SMF network element, so that the branching point managed by the target SMF network element can obtain information about a plurality of anchor UPF network elements in an area accessed by the user equipment. A user plane connection between the branching point and each of the plurality of anchor UPF network elements is established in a target area to which the user equipment moves, to ensure that the first session is not interrupted after the user equipment moves. This improves user experience.

In a possible design, before the second session management function network element sends the identification information of the plurality of session management function network elements to the first session management function network element, the method further includes: The second session management function network element determines that the plurality of session management function network elements respectively manage the plurality of anchor user plane function network elements. In this way, the second SMF network element may obtain, by using the plurality of SMF network elements, the information about the plurality of anchor UPF network elements corresponding to the first session.

In a possible design, the second session management function network element is an anchor session management function network element that provides a session management service for the first session when the first session is established. In this way, the anchor SMF network element sends identifiers of the plurality of SMF network elements to the target SMF network element, so that the target SMF network element can separately receive the information about the plurality of anchor UPF network elements from the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the first session management function network element is a target session management function network element in a session management function network element relocation process, and the second session management function network element is a source session management function network element in the session management function network element relocation process. In this way, the source SMF network element sends identifiers of the plurality of SMF network elements to the target SMF network element, so that the target SMF network element can separately receive the information about the plurality of anchor UPF network elements from the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

In a possible design, the method further includes: The second session management function network element sends an offloading policy of the first session to the first session management function network element. In this way, after obtaining the offloading policy, the target SMF network element may control, based on the offloading policy, a service flow to be transmitted on a user plane path.

According to another aspect, this application further discloses a relocation method. The method includes: A second session management function network element (for example, the second SMF network element) obtains information about a plurality of anchor user plane function network elements of a first session. The second session management function network element sends the information about the plurality of anchor user plane function network elements to a first session management function network element (for example, the first SMF network element or a target SMF network element). The information about the plurality of anchor user plane function network elements is used to establish a connection between a branching point and each of the plurality of anchor user plane function network elements. The branching point is a user plane function network element that is managed by the first session management function network element and that has a function of diverting traffic.

According to the foregoing method, the second SMF network element sends identifiers of the plurality of anchor UPF network elements to the target SMF network element, so that after sending the information about the plurality of anchor UPF network elements to the branching point managed by the target SMF network element, the target SMF network element can establish a user plane connection between the branching point and each of the plurality of anchor UPF network elements. In this way, it is ensured that the first session including the plurality of anchor UPF network elements is not interrupted after user equipment moves, so as to improve user experience.

In a possible design, the second session management function network element is an anchor session management function network element that provides a session management service for the first session when the first session is established.

In a possible design, the first session management function network element is a target session management function network element in a session management function network element relocation process, and the second session management function network element is a source session management function network element in the session management function network element relocation process.

In a possible design, the method further includes: The second session management function network element sends an offloading policy of the first session to the first session management function network element. In this way, after obtaining the offloading policy, the target SMF network element may control, based on the offloading policy, a service flow to be transmitted on a user plane path.

According to another aspect, this application further discloses a relocation method. The method includes: An access and mobility management function network element obtains identification information of a plurality of session management function network elements that manage a plurality of anchor user plane function network elements of a first session. The access and mobility management function network element sends the identification information of the plurality of session management function network elements to a first session management function network element. The identification information of the plurality of session management function network elements is used to obtain information about the plurality of anchor user plane function network elements. The information about the plurality of anchor user plane function network elements is used to establish a connection between a branching point and each of the plurality of anchor user plane function network elements. The branching point is a user plane function network element that is managed by the first session management function network element and that has a function of diverting traffic.

According to the foregoing method, the target SMF network element may obtain identifiers of the plurality of SMF network elements by using the AMF network element, and then separately receive, from the plurality of SMF network elements, the information about the plurality of anchor UPF network elements that are managed by the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after user equipment moves. This improves user experience.

In a possible design, before the access and mobility management function network element sends the identification information of the plurality of session management function network elements to the first session management function network element, the method further includes: The access and mobility management function network element determines that the plurality of session management function network elements respectively manage the plurality of anchor user plane function network elements. In this case, the target SMF network element may obtain identifiers of the plurality of SMF network elements by using the AMF network element, and then separately receive, from the plurality of SMF network elements, the information about the plurality of anchor UPF network elements that are managed by the plurality of SMF network elements.

According to another aspect, an embodiment of this application provides a relocation apparatus. The apparatus has a function of implementing behavior of the first session management function network element in the foregoing method. The function may be implemented by hardware, or may be implemented by hardware by executing corresponding software. The hardware or the software includes one or more modules corresponding to the foregoing function. In a possible design, a structure of the foregoing apparatus includes a processor and a transceiver. The processor is configured to support the apparatus in performing a corresponding function in the foregoing method. The transceiver is configured to implement communication between the foregoing apparatus and a branching point/an access and mobility management function network element/another session management function network element. The apparatus may further include a memory. The memory is configured to be coupled to the processor, and the memory stores a program instruction and data that are necessary for the apparatus.

According to another aspect, an embodiment of this application provides a relocation apparatus. The apparatus has a function of implementing behavior of the second session management function network element in the foregoing method. The function may be implemented by hardware, or may be implemented by hardware by executing corresponding software. The hardware or the software includes one or more modules corresponding to the foregoing function. In a possible design, a structure of the foregoing apparatus includes a processor and a transceiver. The processor is configured to support the apparatus in performing a corresponding function in the foregoing method. The transceiver is configured to implement communication between the foregoing apparatus and a first session management function network element. The apparatus may further include a memory. The memory is configured to be coupled to the processor, and the memory stores a program instruction and data that are necessary for the apparatus.

According to another aspect, an embodiment of this application provides a relocation apparatus. The apparatus has a function of implementing behavior of the access and mobility management function network element in the foregoing method. The function may be implemented by hardware, or may be implemented by hardware by executing corresponding software. The hardware or the software includes one or more modules corresponding to the foregoing function. In a possible design, a structure of the foregoing apparatus includes a processor and a transceiver. The processor is configured to support the apparatus in performing a corresponding function in the foregoing method. The transceiver is configured to implement communication between the foregoing apparatus and a first session management function network element. The apparatus may further include a memory. The memory is configured to be coupled to the processor, and the memory stores a program instruction and data that are necessary for the apparatus.

According to another aspect, an embodiment of this application provides a computer readable storage medium. The computer readable storage medium stores an instruction, and when the instruction is run on a computer, the computer is enabled to perform the method in each of the foregoing aspects.

According to another aspect, an embodiment of this application provides a computer program product including an instruction. When the computer program product is run on a computer, the computer is enabled to perform the method in each of the foregoing aspects.

According to another aspect, this application provides a chip system. The chip system includes a processor, configured to support the foregoing apparatus in implementing functions in the foregoing aspects, for example, generating or processing information in the foregoing methods. In a possible design, the chip system further includes a memory, and the memory is configured to store a program instruction and data that are necessary for the apparatus. The chip system may include a chip, or may include a chip and another discrete device.

BRIEF DESCRIPTION OF DRAWINGS

To describe the technical solutions in the embodiments of the present invention more clearly, the following describes the accompanying drawings required for describing the embodiments of the present invention or the background.

DESCRIPTION OF EMBODIMENTS

The following clearly describes the technical solutions in the embodiments of this application with reference to the accompanying drawings in the embodiments of this application. In this application, "a plurality of" means two or more than two.

Figure 1:
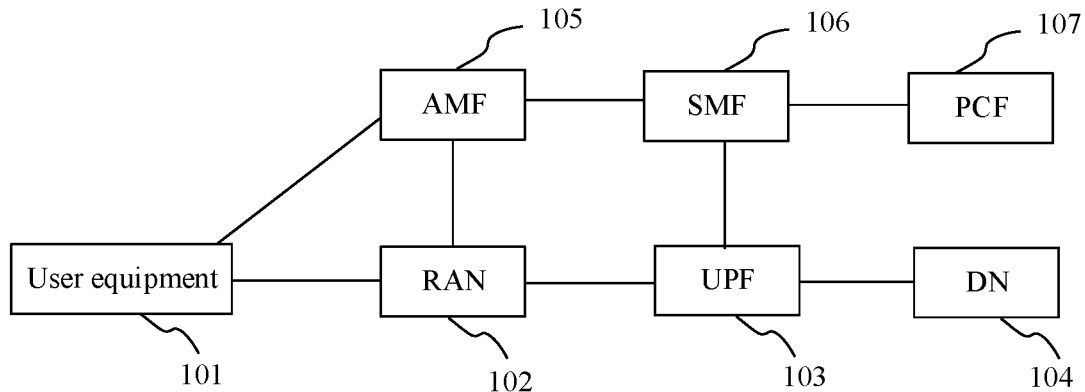
FIG. 1 is a schematic diagram of a 5G communications system according to an embodiment of this application.

FIG. 1 is a schematic diagram of a 5G communications system according to an embodiment of this application. In a 5G mobile network architecture, a control plane function and a forwarding plane function of a mobile gateway are decoupled, and the control plane function obtained after the separation, a conventional control network element mobility management entity (mobility management entity, MME) in the 3rd generation partnership project (third generation partnership project, 3GPP), and the like are combined into a unified control plane (control plane). A user plane function (User plane function, UPF) network element can implement user plane functions (SGW-U and PGW-U) of a serving gateway (serving gateway, SGW) and a packet data network gateway (packet data network gateway, PGW). Further, a unified control plane network element may be divided into an access and mobility management function (access and mobility management function, AMF) network element and a session management function (session management function, SMF) network element.

As shown in FIG. 1, the communications system includes at least user equipment (User Equipment, UE) 101, a RAN device 102, a UPF network element 103, an AMF network element 105, and an SMF network element 106.

The user equipment 101 in the system is not limited to a 5G network, and includes a mobile phone, an internet of things device, a smart household device, an industrial control device, a vehicle device, and the like. The user equipment may also be referred to as a terminal device (Terminal Equipment), a mobile station (Mobile Station), a mobile (Mobile) console, a remote station (Remote Station), a remote terminal (Remote Terminal), an access terminal (Access Terminal), user equipment (User Terminal), or a user agent (User Agent). This is not limited herein. The user equipment 101 may alternatively be an automobile in vehicle-to-vehicle (Vehicle-to-vehicle, V2V) communication, a machine in machine type communication, or the like.

The RAN device 102 is an apparatus configured to provide a wireless communication function for the user equipment 101. The RAN device 102 may include base stations in various forms, for example, a macro base station, a micro base station (also referred to as a small cell), a relay station, and an access point. A name of a device having a base station function may vary with a radio access technology used in a system. For example, in an LTE system, the device is referred to as an evolved NodeB (evolved NodeB, eNB or eNodeB). In a third-generation (3rd Generation, 3G) system, the device is referred to as a NodeB (NodeB). In a new-generation system, the device is referred to as a gNB (gNodeB).

The UPF network element 103 in the system can implement functions such as user packet forwarding, calculation, and detection. An anchor UPF network element is a UPF network element that is used as a network protocol (internet protocol, IP) anchor of the user equipment in a packet data unit (packet data unit, PDU) session. A branching point is a UPF network element that has functions of sending uplink data to different anchor UPF network elements, and aggregating downlink data of the different anchor UPF network elements. The branching point includes a point of concentration (branching point, BP) UPF network element that implements a multi-homed PDU session (multi-homed PDU session) scenario, or a UPF network element that implements an uplink classifier (Uplink Classifier, ULCL). The UPF network element may also be referred to as a UPF device or a UPF entity.

The AMF network element 105 in the system may be responsible for registration, mobility management, a tracking area update procedure, and the like of the terminal device. The AMF network element may also be referred to as an AMF device or an AMF entity.

The SMF network element 106 in the system may be responsible for session management of the terminal device. For example, the session management includes user plane device selection, user plane device reselection, IP address assignment, quality of service (quality of service, QoS) control, and session establishment, modification, or release.

Optionally, the 5G communications system further includes a data network (Data Network, DN) 104. For example, the DN may be a service provided by an operator, an internet access service, or a service provided by a third party.

Optionally, the 5G communications system further includes a policy control function (policy control function, PCF) network element 107. The network element includes a policy control function and a flow-based charging control function. For example, the PCF network element 107 may implement a user subscription data management function, a policy control function, a charging policy control function, and QoS control. The PCF network element may also be referred to as a PCF entity or a PCF device.

The foregoing network elements may be network elements that are implemented on dedicated hardware, or may be software instances that are run on dedicated hardware, or may be instances that implement a virtualization function on a proper platform. For example, the foregoing virtualization platform may be a cloud platform.

In addition, the embodiments of this application are also applicable to another future-oriented communications technology. The network architecture and the service scenario described in this application are intended to describe the technical solutions in this application more clearly, but are not intended to limit the technical solutions provided in this application. A person of ordinary skill in the art may know that, with evolution of network architectures and emergence of new service scenarios, the technical solutions provided in this application are also applicable to a similar technical problem.

The following uses the 5G communications system shown in FIG. 1 as an example to describe the technical solutions in this application in detail by using some embodiments. The following several embodiments may be combined with each other, and concepts or processes that are the same or similar may not be described again in some embodiments.

Figure 2:
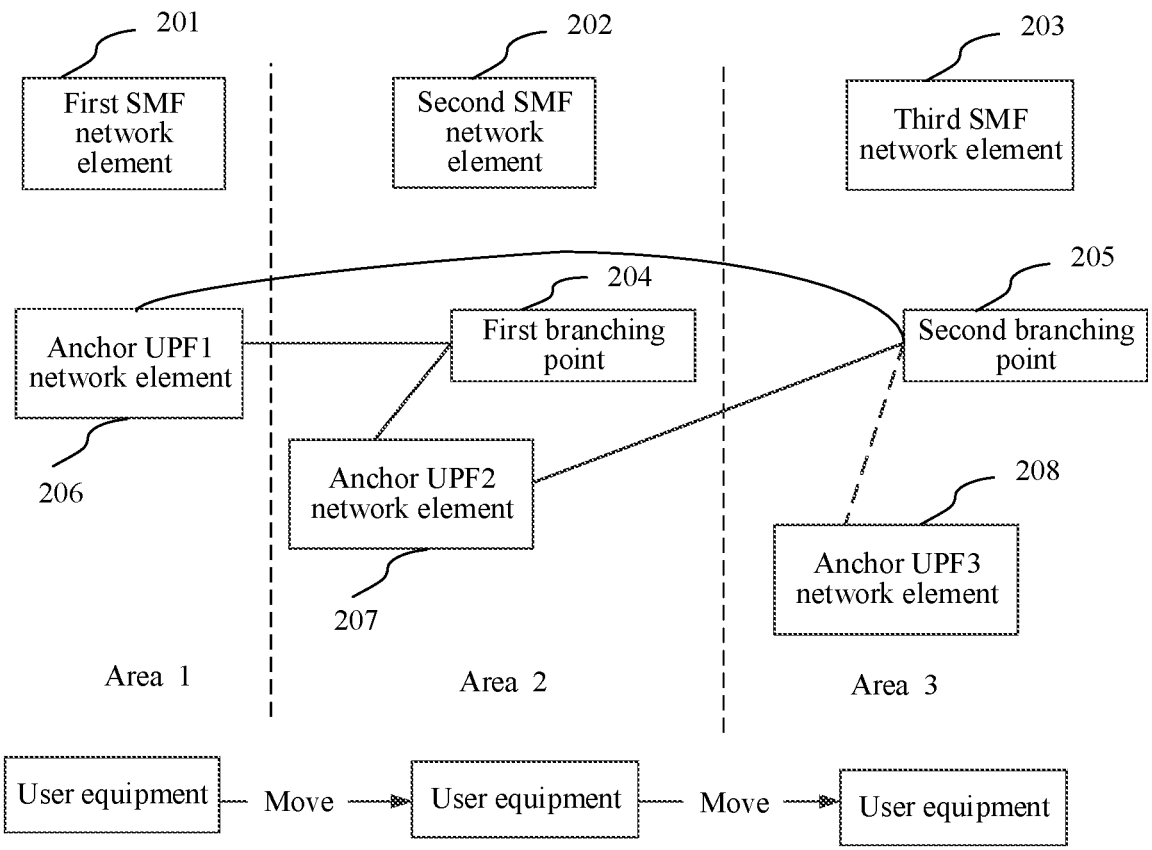
FIG. 2 is a schematic diagram of a scenario of performing SMF network element relocation according to an embodiment of this application.

FIG. 2 is a schematic diagram of a scenario of performing SMF network element relocation according to an embodiment of this application. As shown in FIG. 2, user equipment establishes a first session in an area 1, and the first session has one user plane path in the area 1: The user equipment accesses a central DN by using an anchor UPF1 network element 206. The anchor UPF1 network element 206 is managed by a first SMF network element 201.

When the user equipment moves to an area 2 from the area 1, because the user equipment is not in a service area of the first SMF network element 201, in other words, moves out of the service area of the first SMF network element 201, a core network inserts a second SMF network element 202 into the area 2 to serve the user equipment. Assuming that the core network may perform local offloading on the first session in the area 2, a first branching point 204 and an anchor UPF2 network element 207 are inserted in addition to the second SMF network element 202. The first branching point 204 is configured to offload the first session, and the second SMF network element 202 is configured to manage the first branching point 204 and the anchor UPF2 network element 207. In this case, the first session has two user plane paths in the area 2: (1) The user equipment is connected to the anchor UPF1 network element 206 by using the first branching point 204, and then accesses the central DN. (2) The user equipment is connected to the anchor UPF2 network element 207 by using the first branching point 204, and then accesses a local DN in the area 2.

When the user equipment moves to an area 3 from the area 2, because the user equipment is not in a service area of the second SMF network element 202, in other words, moves out of the service area of the second SMF network element 202, the core network performs a relocation process of the second SMF network element 202, and selects a target SMF network element in the area 3 to serve the user equipment, in other words, selects a third SMF network element 203. In addition, when the user equipment moves to the area 3, the first session also needs to be offloaded. Therefore, the core network selects a second branching point 205 in the area 3 to serve the user equipment. In this case, to ensure that the central DN and the local DN in the area 2 can be separately accessed in the area 3 by using the first session, after the second SMF network element 202 is redirected, the following two user plane paths are established: (1) The user equipment is connected to the anchor UPF1 network element 206 by using the second branching point 205, and then accesses the central DN. (2) The user equipment is connected to the anchor UPF2 network element 207 by using the second branching point 205, and then accesses the local DN in the area 2. Assuming that the core network may perform local offloading on the first session in the area 3, an anchor UPF3 network element 208 is inserted in addition to the third SMF network element 203. The third SMF network element 203 is configured to manage the second branching point 205 and the anchor UPF3 network element 208. In this case, another user plane path is established: (3) The user equipment is connected to the anchor UPF3 network element 208 by using the second branching point 205, and then accesses a local DN in the area 3.

Figure 3:
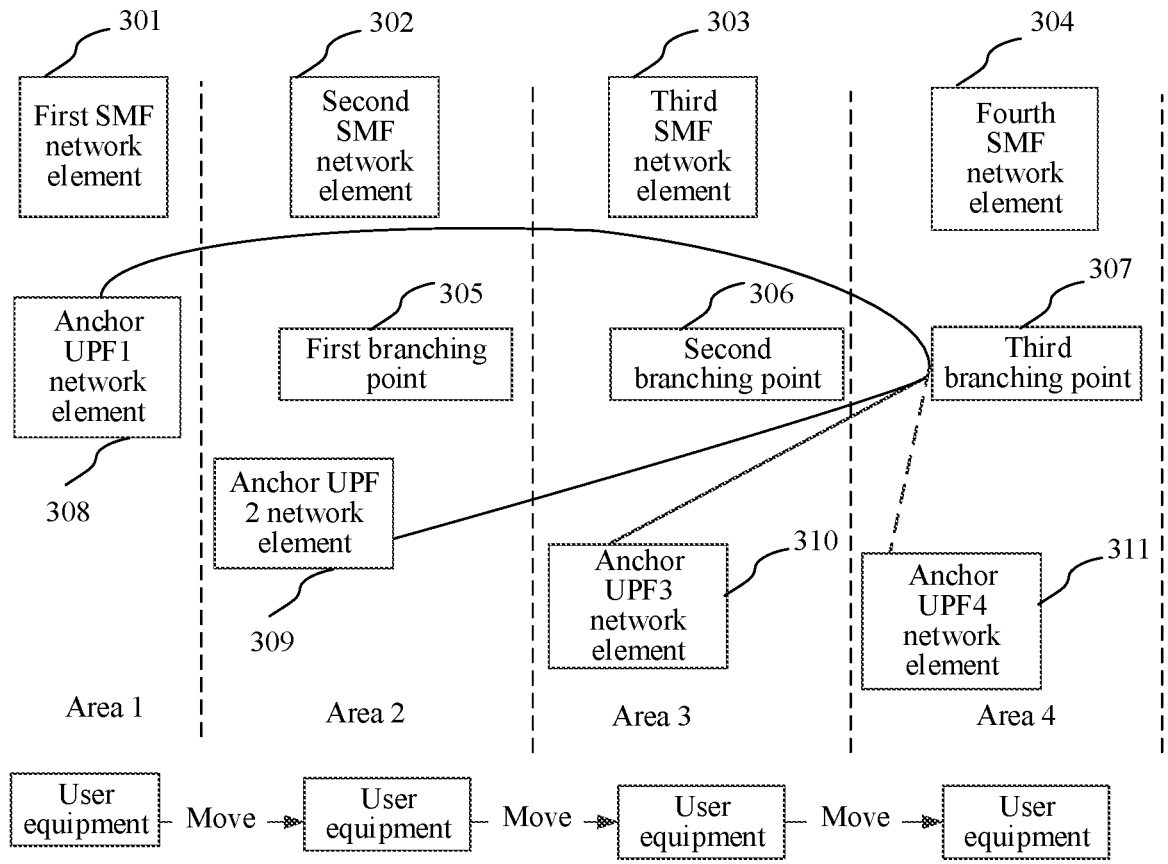
FIG. 3 is a schematic diagram of another scenario of performing SMF network element relocation according to an embodiment of this application.

FIG. 3 is a schematic diagram of another scenario of performing SMF network element relocation according to an embodiment of this application. In the scenario shown in FIG. 3, for a process in which user equipment establishes a first session in an area 1 and establishes one user plane path, a process in which the user equipment moves to an area 2 from the area 1 and establishes two user plane connections in the area 2, and a process in which the user equipment moves to an area 3 from the area 2 and establishes three user plane connections in the area 3, refer to the descriptions in the scenario in FIG. 2. Details are not described herein again. In the scenario shown in FIG. 3, when the user equipment moves to an area 4 from the area 3, a fourth SMF network element 304 is inserted. To ensure that the first session can separately access, in the area 4, a central DN, a local DN in the area 2, and a local DN in the area 3, after a third SMF network element is redirected, the following three user plane paths are established: (1) The user equipment is connected to an anchor UPF1 network element 308 by using a third branching point 307, and then accesses the central DN in the central 1. (2) The user equipment is connected to an anchor UPF2 network element 309 by using the third branching point 307, and then accesses the local DN in the area 2. (3) The user equipment is connected to an anchor UPF3 network element 310 by using the third branching point 307, and then accesses the local DN in the area 3. Assuming that the user equipment may perform local offloading in the area 4, an anchor UPF4 network element 311 is inserted in addition to a target SMF network element, and is configured to offload the first session. In this case, another user plane path is established: (4) The user equipment is connected to the anchor UPF4 network element 311 by using the third branching point 307, and then accesses a local DN in the area 4.

It should be noted that, when the user equipment continues to move to another area (for example, an area 5) that is not accessed by the user equipment, for a process of redirecting a newly inserted SMF network element, refer to the operation performed on the fourth SMF network element in the scenario shown in FIG. 3. To be specific, a user plane connection between a newly established branching point and an anchor UPF network element in an area accessed by the user equipment is established.

Figure 4:
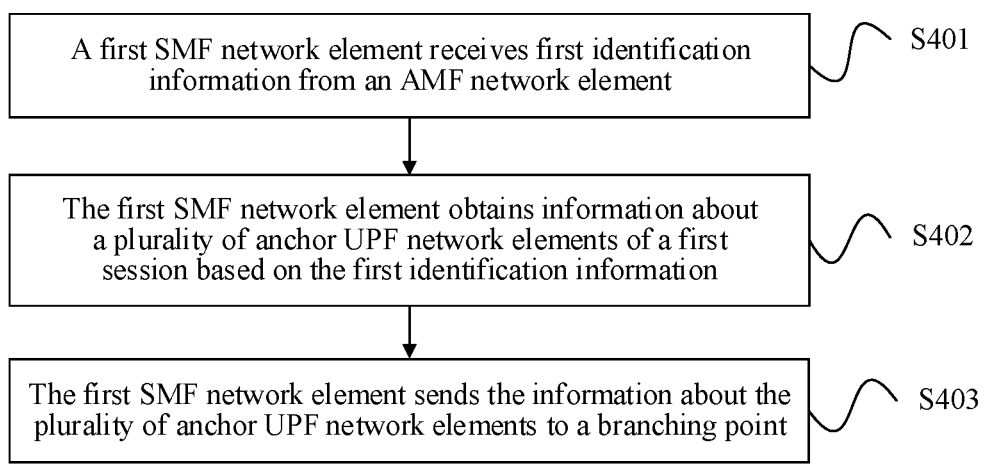
FIG. 4 shows a relocation method according to an embodiment of this application.

FIG. 4 shows a relocation method according to an embodiment of this application. The method is applicable to the scenario of performing SMF network element relocation that is described in FIG. 2 or FIG. 3. According to the method, when user equipment moves to an area 2 from an area 1, and then moves to another area from the area 2, in a process of performing SMF network element relocation, a session established in the area 1 is not interrupted after the user equipment moves. As shown in FIG. 4, with reference to the descriptions in FIG. 2 and FIG. 3, the method may include the following steps.

S401. A first SMF network element receives first identification information from an AMF network element.

For example, the first SMF network element is the SMF network element 106 in FIG. 1, and the AMF network element is the AMF network element 105 in FIG. 1. In this embodiment, the first SMF network element is a target SMF network element in a relocation process, namely, an SMF network element in a target area to which the user equipment moves in the relocation process. For example, the first SMF network element is the third SMF network element 203 in FIG. 2, or the fourth SMF network element 304 in FIG. 3.

For example, the first identification information may include information in any one of the following three manners:

In a first possible manner, the first identification information may include an identifier of a source SMF network element in the relocation process. The source SMF network element is an SMF network element in an area in which the user equipment is located in the relocation process. For example, the source SMF network element is the second SMF network element 202 in FIG. 2, or the third SMF network element 303 in FIG. 3.

In a second possible manner, the first identification information may include identification information of a plurality of SMF network elements that manage a plurality of anchor UPF network elements. For example, in the scenario in FIG. 2, the first identification information includes identification information of the first SMF network element 201 that manages the anchor UPF1 network element 206 and identification information of the second SMF network element 202 that manages the anchor UPF2 network element 207. Alternatively, in the scenario in FIG. 3, the first identification information includes the first SMF network element 301 that manages the anchor UPF1 network element 308, the second SMF network element 302 that manages the anchor UPF2 network element 309, and the third SMF network element 303 that manages the anchor UPF3 network element 310.

In a third possible manner, the first identification information may include identification information of an anchor SMF network element that provides a session management service for a first session when the first session is established. For example, the anchor SMF network element is the first SMF network element 201 in FIG. 2, or the first SMF network element 301 in FIG. 3.

S402. The first SMF network element obtains information about a plurality of anchor UPF network elements of a first session based on the first identification information.

For example, in the scenario in FIG. 2, the plurality of anchor UPF network elements of the first session include the anchor UPF1 network element 206 and the anchor UPF2 network element 207. Alternatively, in the scenario in FIG. 3, the plurality of anchor UPF network elements of the first session include the anchor UPF1 network element 308, the anchor UPF2 network element 309, and the anchor UPF3 network element 310.

The first SMF network element may obtain the information about the plurality of anchor UPF network elements of the first session based on the first identification information in any one of the following five manners:

In a first possible implementation, assuming that the first identification information includes the identifier of the source SMF network element in the relocation process, the first SMF network element receives, from the source SMF network element, identification information of a plurality of SMF network elements that manage the plurality of anchor UPF network elements, and separately receives the information about the plurality of anchor UPF network elements from the plurality of SMF network elements. The foregoing process may be further described with reference to FIG. 5 and FIG. 6.

In a second possible implementation, assuming that the first identification information includes the identifier of the source SMF network element in the relocation process, the first SMF network element receives the information about the plurality of anchor UPF network elements from the source SMF network element. The foregoing process may be further described with reference to FIG. 7.

In a third possible implementation, assuming that the first identification information includes the identification information of the plurality of SMF network elements that manage the plurality of anchor UPF network elements, the first SMF network element separately receives the information about the plurality of anchor UPF network elements from the plurality of SMF network elements. The foregoing process may be further described with reference to FIG. 8.

In a fourth possible implementation, assuming that the first identification information includes the identification information of the anchor SMF network element that provides the session management service for the first session when the first session is established, the first SMF network element receives, from the anchor SMF network element, identification information of a plurality of SMF network elements that manage the plurality of anchor UPF network elements, and separately receives the information about the plurality of anchor UPF network elements from the plurality of SMF network elements. The foregoing process may be further described with reference to FIG. 9 and FIG. 10.

In a fifth possible implementation, assuming that the first identification information includes the identification information of the anchor SMF network element that provides the session management service for the first session when the first session is established, the first SMF network element receives the information about the plurality of anchor UPF network elements from the anchor SMF network element. The foregoing process may be further described with reference to FIG. 11.

S403. The first SMF network element sends the information about the plurality of anchor UPF network elements to a branching point, where the branching point is a UPF network element that is managed by the first SMF network element and that has a function of diverting traffic.

For example, the branching point is the second branching point 205 in FIG. 2 that is managed by the third SMF network element 203, or the third branching point 307 in FIG. 3 that is managed by the fourth SMF network element 304.

According to the method in this embodiment of the present invention, in the scenarios in FIG. 2 and FIG. 3, after establishing the first session in the area 1, the user equipment moves to the area 2, and continues to move to another area from the area 2. In this case, in the process of performing SMF network element relocation, the branching point managed by the target SMF network element may obtain information about a plurality of anchor UPF network elements in an area accessed by the user equipment. A user plane connection between the branching point and each of the plurality of anchor UPF network elements is established in a target area to which the user equipment moves, to ensure that the first session is not interrupted after the user equipment moves. This improves user experience.

Figure 5:
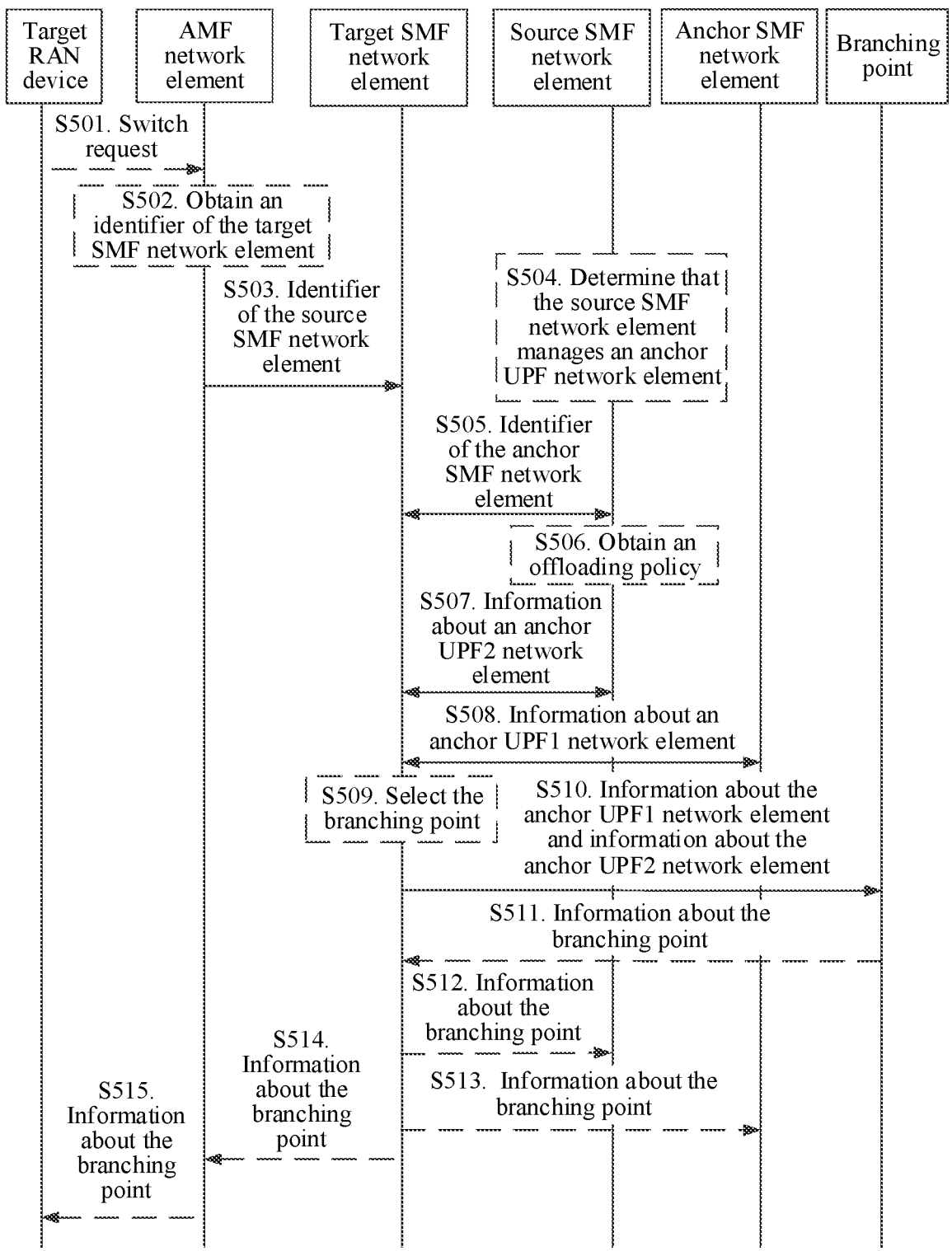
FIG. 5 is a flowchart of a relocation method according to an embodiment of this application.

FIG. 5 is a flowchart of a relocation method according to an embodiment of this application. The method shown in FIG. 5 is used to describe the first possible implementation in step S402 in FIG. 4 in the scenario described in FIG. 2. To be specific, when the first identification information includes the identifier of the source SMF network element in the relocation process, the first SMF network element receives, from the source SMF network element, the identification information of the plurality of SMF network elements that manage the plurality of anchor UPF network elements, and separately receives the information about the plurality of anchor UPF network elements from the plurality of SMF network elements. FIG. 5 is described with reference to FIG. 2 and FIG. 4. As shown in FIG. 5, the method may include the following steps.

S501. A target RAN device sends a switch request to an AMF network element, and correspondingly, the AMF network element receives the switch request from the target RAN device.

For example, the target RAN device is the RAN device 102 in FIG. 1, and the AMF network element is the AMF network element 105 in FIG. 1. For example, the switch request may be an N2 path switch request (N2 Path switch request) message or a switch request (Handover Required) message.

Optionally, the switch request further includes an identifier of a session that needs to be switched, namely, an identifier of a first session, and N2 session management information (N2 Session Management Information). The N2 session management information further includes an accepted quality of service flow (accepted QoS Flows) list. The first session is the first session in step S401 in FIG. 4.

S502. The AMF network element obtains an identifier of a target SMF network element.

For example, the target SMF network element is the first SMF network element in FIG. 4. In the scenario in FIG. 2, the target SMF network element may be the third SMF network element 203 in FIG. 2.

The AMF network element may obtain the identifier of the target SMF network element in either of the following two manners:

In a first possible manner, the AMF network element selects, based on a location of user equipment and service area information of an SMF network element, the target SMF network element that can serve the user equipment in an area in which the user equipment is located, to obtain the identifier of the target SMF network element.

Optionally, in the first possible manner, before the AMF network element selects the target SMF network element, the AMF network element sends the location information of the user equipment to a source SMF network element. For example, the location information may be sent by using an N11 message. The source SMF network element determines, based on the location information of the user equipment and service area information of the source SMF network element, that the user equipment moves out of a service area of the source SMF network element, and sends first indication information to the AMF network element. The first indication information is used to indicate that the user equipment moves out of the service area of the source SMF network element. For example, the source SMF network element may send the first indication information to the AMF network element by using an N11 response message. After receiving the first indication information, the AMF network element selects, based on the location of the user equipment and the service area information of the SMF network element, the target SMF network element that can serve the user equipment in the area in which the user equipment is located.

In a second possible manner, the AMF network element sends location information of user equipment to the source SMF network element. The source SMF network element is the second SMF network element 202 in FIG. 2. For example, the location information may be sent by using an N11 message, or may be sent by invoking an Nsmf_PDUSession_UpdateSMContext Request service or an Namf_EventExposure_Notify service. The source SMF network element selects the target SMF network element based on the location information, and sends the identifier of the target SMF network element to the AMF network element. For example, the source SMF network element may send the identifier of the target SMF network element to the AMF network element by using an N11 response message (or by invoking an Nsmf_PDUSession_UpdateSMContext Response service or Namf_EventExposure_Notify Response service).

Optionally, in the second possible manner, before the source SMF network element selects the target SMF network element, the AMF network element determines, based on the location information of the user equipment and service area information of the source SMF network element, that the user equipment moves out of a service area of the source SMF network element, and sends second indication information to the AMF network element. The second indication information is used to indicate that the user equipment moves out of the service area of the source SMF network element. For example, the AMF network element may send the second indication information to the source SMF network element by using the N11 message. After receiving the second indication information, the source SMF network element selects the target SMF network element based on the location of the user equipment.

S503. The AMF network element sends the identifier of the source SMF network element to the target SMF network element, and correspondingly, the target SMF network element receives the identifier of the source SMF network element from the AMF network element.

For example, the AMF network element stores the identifier of the source SMF network element in a process of inserting the source SMF network element. The AMF network element may send the identifier of the source SMF network element to the target SMF network element by using an update session management context request message (or by invoking an Nsmf_PDUSession_UpdateSMContext Request service). Optionally, the update session management context request message further includes the identifier of the first session and the N2 session management information.

S505. The target SMF network element obtains an identifier of an anchor SMF network element from the source SMF network element.

For example, the anchor SMF network element is the first SMF network element 201 in FIG. 2. The source SMF network element obtains the identifier of the anchor SMF network element in a process of inserting the source SMF network element.

For example, the target SMF network element sends a context obtaining request to the source SMF network element (or invokes an Nsmf_PDUSession_UpdateSMContext Request service), to request a session management context. Optionally, the context obtaining request includes the identifier of the first session. After receiving the context obtaining request, the source SMF network element sends a context obtaining response to the target SMF network element. The context obtaining response includes the identifier of the anchor SMF network element.

Optionally, the context obtaining response further includes information about an anchor UPF2 network element.

Optionally, the target SMF network element further obtains the identifier of the source SMF network element from the source SMF network element.

S507. The target SMF network element obtains the information about the anchor UPF2 network element from the source SMF network element.

For example, the anchor UPF2 network element is the anchor UPF2 network element 207 in FIG. 2. The target SMF network element interacts with the source SMF network element, to obtain the information about the anchor UPF2 network element. For example, the target SMF network element sends an N4 session modification request to the source SMF network element, and the source SMF network element returns an N4 session modification response to send the information about the anchor UPF2 network element to the target SMF network element.

It should be noted that, if the context obtaining response sent by the source SMF network element to the target SMF network element in step S505 includes the information about the anchor UPF2 network element, S507 may not be performed.

S508. The target SMF network element obtains information about an anchor UPF1 network element from the anchor SMF network element.

For example, the anchor UPF1 network element is the anchor UPF1 network element 206 in FIG. 2. The target SMF network element interacts with the anchor SMF network element based on the identifier of the anchor SMF network element that is obtained in step S505, to obtain the information about the anchor UPF1 network element. For example, the target SMF network element sends an N4 session modification request to the anchor SMF network element, and the anchor SMF network element returns an N4 session modification response to send the information about the anchor UPF1 network element to the target SMF network element.

It should be noted that in this application, step S505 may be performed before step S507 and step S508. A sequence of step S507 and step S508 is not limited. To be specific, step S507 may be performed before step S508, or step S508 may be performed before step S507, or steps S507 and S508 are simultaneously performed. In this application, step S505 and step S507 may be simultaneously performed before step S508.

S509. The target SMF network element selects a branching point.

For example, the branching point is the second branching point 205 in FIG. 2.

Optionally, when user plane information is allocated by the target SMF network element, an N4 session establishment request sent by the target SMF network element to the branching point includes information about the branching point. After receiving the N4 session establishment request, the branching point returns an N4 session establishment response to the target SMF network element.

It should be noted that a sequence of performing steps S509, S507, and S508 is not limited in the present invention. When step S509 is performed before S507 and S508, step S509 further includes: After selecting the branching point, the target SMF network element establishes an N4 session connection to the branching point. For example, the target SMF network element sends the N4 session establishment request to the branching point, and the branching point returns the N4 session establishment response for carrying the information about the branching point. In this case, the N4 session modification request in S507 and S508 may further include the information about the second branching point 205.

S510. The target SMF network element sends the information about the anchor UPF1 network element and the information about the anchor UPF2 network element to the branching point, and correspondingly, the branching point receives the information about the anchor UPF1 network element and the information about the anchor UPF2 network element from the target SMF network element.

Optionally, when S509 is performed before S507 and S508, step S510 includes: The target SMF network element sends the information about the anchor UPF1 network element and the information about the anchor UPF2 network element to the branching point by using the N4 session modification request. When S509 is performed after S507 and S508, step S510 includes: The target SMF network element sends the information about the anchor UPF1 network element and the information about the anchor UPF2 network element to the branching point by using the N4 session establishment request.

According to the method in this embodiment of the present invention, in the scenario shown in FIG. 2, after establishing the first session in the area 1, the user equipment moves to the area 2, and continues to move to another area from the area 2. In this case, the target SMF network element may obtain the identifier of the source SMF network element by using the AMF network element, receive the identifier of the anchor SMF network element from the source SMF network element, and separately receive the information about the plurality of anchor UPF network elements from the source SMF network element and the anchor SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, the method further includes step S504.

S504. The source SMF network element determines that the source SMF network element manages an anchor UPF network element.

It should be noted that the source SMF network element determines that the source SMF network element manages the anchor UPF network element. Because both the anchor UPF network element and the branching point are managed by the source SMF network element, it may be further understood that the source SMF network element determines that the source SMF network element manages the branching point.

For example, after receiving the context obtaining request message sent by the target SMF network element, the source SMF network element determines that the source SMF network element manages the anchor UPF network element.

For example, when the source SMF network element determines that the source SMF network element manages the anchor UPF network element, in step S505, the context obtaining response sent by the source SMF network element to the target SMF network element includes the identifier of the source SMF network element, so that the target SMF network element can obtain, from the source SMF network element in step S507, information about the anchor UPF network element managed by the source SMF network element.

For example, when the source SMF network element determines that the source SMF network element manages the anchor UPF network element, the target SMF network element can obtain the information about the anchor UPF from the source SMF network element in step S507. When the source SMF network element determines that the source SMF network element does not manage the anchor UPF network element, the target SMF network element cannot obtain the information about the anchor UPF network element from the source SMF network element, and therefore may not perform S507. In this way, signaling overheads can be reduced.

It should be noted that a sequence of step S504 and step S505 is not limited in this application. To be specific, step S504 may be performed before step S505, or step S505 may be performed before step S504, or steps S504 and S505 are simultaneously performed.

Optionally, the method further includes step S506.

S506. The source SMF network element obtains an offloading policy.

For example, the offloading policy may be a multi-homed offloading policy or a ULCL offloading policy. After obtaining the offloading policy, the source SMF network element may send the offloading policy to the target SMF network element in step S507, and the target SMF network element controls, based on the offloading policy, a service flow to be transmitted on a user plane path.

It should be noted that a sequence of performing steps S506 and S505 is not limited in the present invention. When S506 is performed before S505, the source SMF network element may send the obtained offloading policy to the target SMF network element in step S505.

Optionally, if the N4 session modification request in steps S507 and S508 does not include the information about the second branching point 205, the method further includes steps S511 to S513.

S511. The branching point sends the information about the branching point to the target SMF network element, and correspondingly, the target SMF network element receives the information about the branching point from the branching point.

For example, in step S510, the branching point receives the N4 session establishment request sent by the target SMF network element, and in step S511, the branching point sends the information about the branching point to the target SMF network element by using the N4 session establishment response. Alternatively, in step S510, the branching point receives the N4 session modification request sent by the target SMF network element, and in step S511, the branching point sends the information about the branching point to the target SMF network element by using the N4 session modification response.

S512. The target SMF network element sends the information about the branching point to the source SMF network element, and correspondingly, the source SMF network element receives the information about the branching point from the target SMF network element.

For example, the source SMF network element obtains the information about the branching point, and sends the information about the branching point to the anchor UPF2 network element, so that the anchor UPF2 network element can obtain the information about the branching point. In this way, a service flow is forwarded from the anchor UPF2 network element to the branching point.

S513. The target SMF network element sends the information about the branching point to the anchor SMF network element, and correspondingly, the anchor SMF network element receives the information about the branching point from the target SMF network element.

For example, the anchor SMF network element obtains the information about the branching point, and sends the information about the branching point to the anchor UPF1 network element, so that the anchor UPF1 network element can obtain the information about the branching point. In this way, a service flow is forwarded from the anchor UPF1 network element to the branching point.

Optionally, after step S510 is performed, the method further includes steps S514 and S515.

S514. The target SMF network element sends the information about the branching point to the AMF network element, and correspondingly, the AMF network element receives the information about the branching point from the target SMF network element.

For example, the target SMF network element may send the information about the branching point to the AMF network element by using a session management context response message.

S515. The AMF network element sends the information about the branching point to the target RAN device, and correspondingly, the target RAN device receives the information about the branching point from the AMF network element.

For example, the AMF network element may send the information about the branching point to the target RAN device by using an N2 path switch request ack (N2 Path switch request ack) message. Alternatively, the AMF network element may send the information about the branching point to the target RAN device by using a switch request message.

Figure 6:
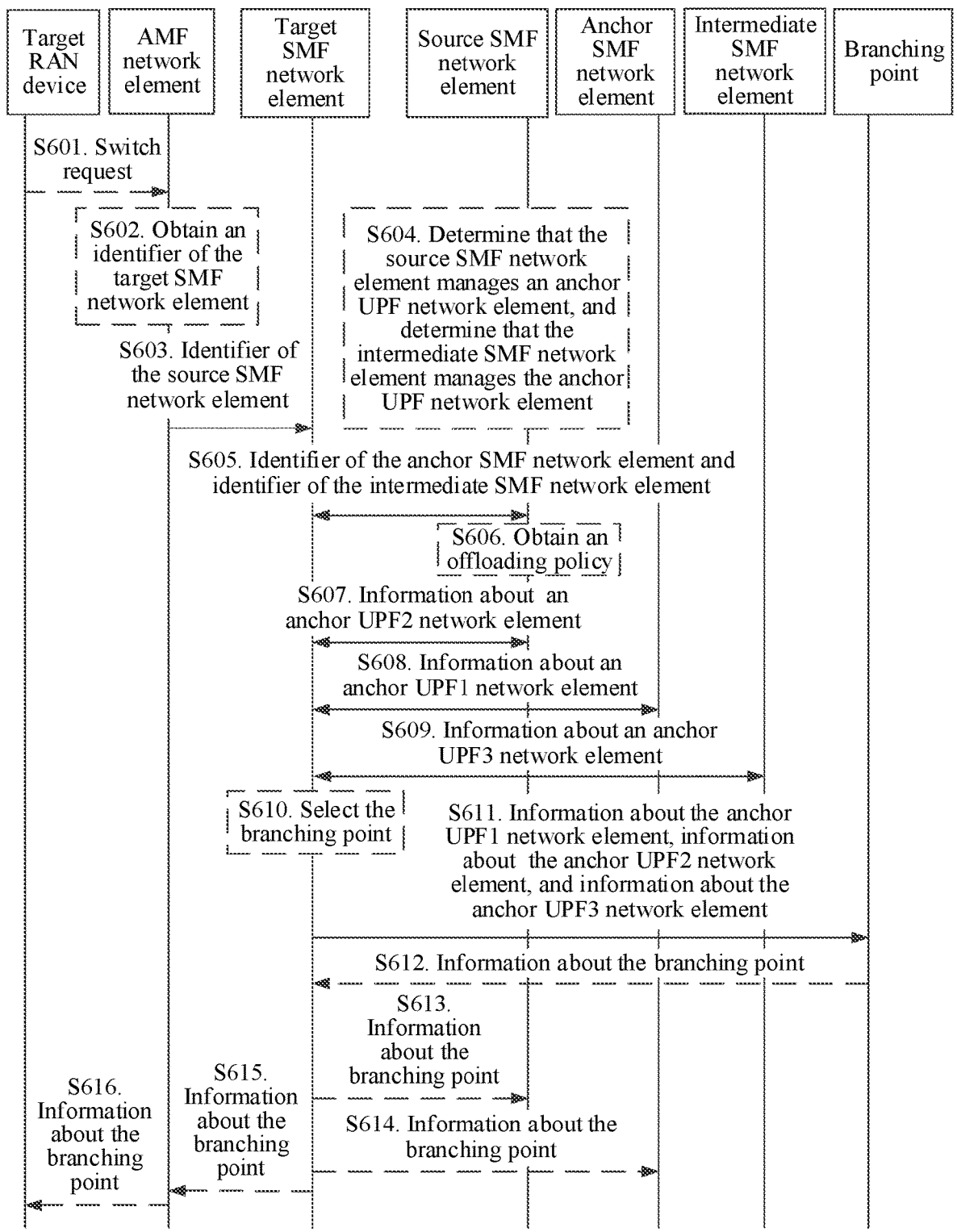
FIG. 6 is a flowchart of another relocation method according to an embodiment of this application.

FIG. 6 is a flowchart of another relocation method according to an embodiment of this application. The method shown in FIG. 6 is used to describe the first possible implementation in step S402 in FIG. 4 in the scenario described in FIG. 3. To be specific, when the first identification information includes the identifier of the source SMF network element in the relocation process, the first SMF network element receives, from the source SMF network element, the identification information of the plurality of SMF network elements that manage the plurality of anchor UPF network elements, and separately receives the information about the plurality of anchor UPF network elements from the plurality of SMF network elements. FIG. 6 is described with reference to FIG. 3, FIG. 4, and FIG. 5.

As shown in FIG. 6, for example, a target SMF network element in FIG. 6 may be the fourth SMF network element 304 in FIG. 3. A source SMF network element in FIG. 6 may be the third SMF network element 303 in FIG. 3. An anchor SMF network element in FIG. 6 may be the first SMF network element 301 in FIG. 3. An intermediate SMF network element in FIG. 6 may be the second SMF network element 302 in FIG. 3.

Optionally, if user equipment further moves to another area (for example, an area 5) before moving to an area 3, the intermediate SMF network element in FIG. 6 further includes an SMF network element in an area that has been accessed by the user equipment before the area 3.

For steps S601 to S603, refer to the descriptions of steps S501 to S503 in FIG. 5. Details are not described herein again.

S605. The target SMF network element obtains an identifier of the anchor SMF network element and an identifier of the intermediate SMF network element from the source SMF network element.

For example, the source SMF network element may obtain the identifier of the anchor SMF network element in a process of inserting the source SMF network element. For example, when the user equipment moves to the area 3 from an area 2, in a process of performing SMF network element relocation, the source SMF network element may obtain the identifier of the intermediate SMF network element.

For example, the target SMF network element sends a context obtaining request to the source SMF network element, to request a session management context. Optionally, the context obtaining request includes the identifier of the first session. After receiving the context obtaining request, the source SMF network element sends a context obtaining response to the target SMF network element. The context obtaining response includes the identifier of the anchor SMF network element and the identifier of the intermediate SMF network element.

Optionally, the target SMF network element further obtains the identifier of the source SMF network element from the source SMF network element.

For steps S606 to S608, refer to the descriptions of steps S506 to S508 in FIG. 5. Details are not described herein again.

In an example of FIG. 6, the method may further include the following steps.

S609. The target SMF network element obtains information about an anchor UPF3 network element from the intermediate SMF network element.

For example, the anchor UPF3 network element is the anchor UPF2 network element 309 in FIG. 3. The target SMF network element interacts with the intermediate SMF network element, to obtain the information about the anchor UPF3 network element. For example, the target SMF network element sends an N4 session modification request to the intermediate SMF network element, and the intermediate SMF network element returns an N4 session modification response to send the information about the anchor UPF3 network element to the target SMF network element.

It should be noted that a sequence of performing steps S607, S608, and S609 is not limited in the present invention.

S611. The target SMF network element sends the information about the anchor UPF1 network element, the information about the anchor UPF2 network element, and the information about the anchor UPF3 network element to a branching point, and correspondingly, the branching point receives the information about the anchor UPF1 network element, the information about the anchor UPF2 network element, and the information about the anchor UPF3 network element from the target SMF network element.

For example, the target SMF network element establishes an N4 session connection to the branching point, to send the information about the anchor UPF1 network element, the information about the anchor UPF2 network element, and the information about the anchor UPF3 network element to the branching point.

For step S610, refer to the description of step S509 in FIG. 5. Details are not described herein again.

It should be further noted that a sequence of performing S610 and S607, S608, and S609 is not limited in the present invention. When S610 is performed before S607, S608, and S609, the N4 session modification request in S607, S608, and S609 carries the information about the branching point.

According to the method in this embodiment of the present invention, in the scenario shown in FIG. 3, after establishing the first session in the area 1, the user equipment moves to the area 2, moves to the area 3 from the area 2, and moves to another area from the area 3. In this case, the target SMF network element may obtain the identifier of the source SMF network element by using the AMF network element, receive the identifier of the anchor SMF network element and the identifier of the intermediate SMF network element from the source SMF network element, and separately receive the information about the plurality of anchor UPF network elements from the source SMF network element, the anchor SMF network element, and the intermediate SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, in a process of performing step S605, the source SMF network element performs step S604.

S604. The source SMF network element determines that the source SMF network element manages the branching point, and the source SMF network element determines that the intermediate SMF network element manages the branching point.

It should be noted that, that the source SMF network element determines that the source SMF network element manages the branching point may be further described as that the source SMF network element determines that the source SMF network element manages the anchor UPF network element. That the source SMF network element determines that the intermediate SMF network element manages the branching point may be further described as that the source SMF network element determines that the intermediate SMF network element manages the anchor UPF network element.

For example, for a process in which the source SMF network element determines that the source SMF network element manages the branching point, refer to the description of step S504 in FIG. 5. Details are not described herein again.

For example, the source SMF network element may determine, in the following manner, that the intermediate SMF network element manages the branching point: After receiving the context obtaining request sent by the target SMF network element, the source SMF network element sends a query request to the intermediate SMF network element. The query request is used to query whether the intermediate SMF network element manages the branching point. The intermediate SMF network element returns a query response message to the source SMF network element. The query response message includes indication information, and the indication information is used to indicate that the intermediate SMF network element manages the branching point. For example, when the source SMF network element determines that the source SMF network element manages the branching point, in step S605, the context obtaining response sent by the source SMF network element to the target SMF network element includes the identifier of the source SMF network element. When the source SMF network element determines that the intermediate SMF network element manages the branching point, in step S605, the context obtaining response sent by the source SMF network element to the target SMF network element includes the identifier of the intermediate SMF network element.

For example, when the source SMF network element determines that the source SMF network element and the intermediate SMF network element manage the branching point, the target SMF network element obtains the information about the anchor UPF2 from the source SMF network element in step S607, and obtains the information about the anchor UPF3 from the intermediate SMF network element in step S609. When the source SMF network element determines that the source SMF network element does not manage the branching point, the target SMF network element may not perform S607. Alternatively, when the source SMF network element determines that the intermediate SMF network element does not manage the branching point, the target SMF network element may not perform S609. In this way, signaling overheads can be reduced.

Optionally, after step S611 is performed, the method further includes steps S612 to S616. For steps S612 to S616, refer to the descriptions of steps S511 to S515 in FIG. 5. Details are not described herein again.

Figure 7:
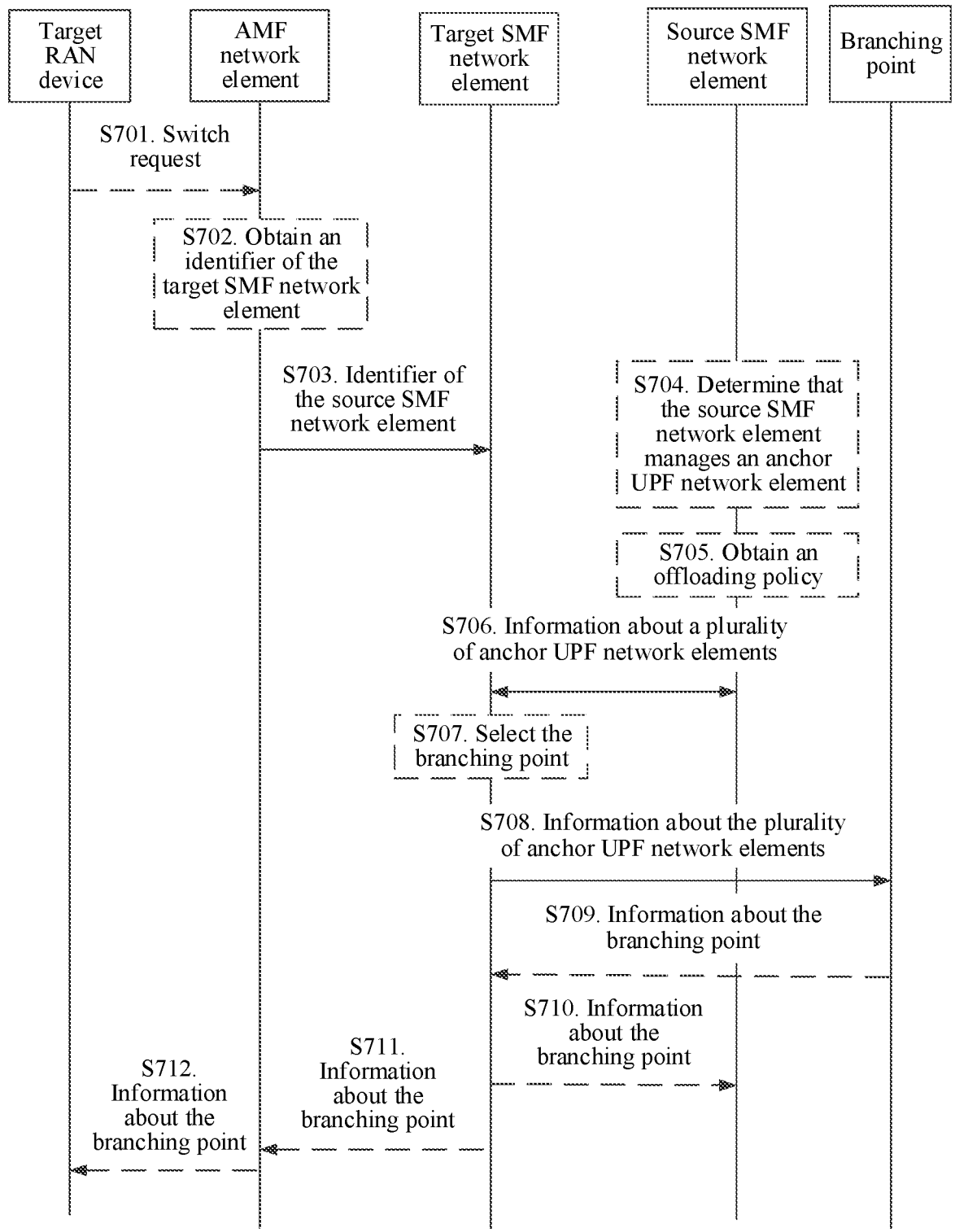
FIG. 7 is a flowchart of another relocation method according to an embodiment of this application.

FIG. 7 is a flowchart of another relocation method according to an embodiment of this application. The method shown in FIG. 7 is used to describe the second possible implementation in step S402 in FIG. 4 in the scenario described in FIG. 2 or FIG. 3. To be specific, when the first identification information includes the identifier of the source SMF network element in the relocation process, the first SMF network element receives the information about the plurality of anchor UPF network elements from the source SMF network element. FIG. 7 is described with reference to FIG. 2, FIG. 3, FIG. 4, FIG. 5, and FIG. 6.

For steps S701 to S703, refer to the descriptions of steps S501 to S503 in FIG. 5. For step S704, refer to the description of step S504 in FIG. 5 or step S604 in FIG. 6. For step S705, refer to the description of step S506 in FIG. 5 or step S606 in FIG. 6. Details are not described herein again.

In an example of FIG. 7, the method may further include the following steps.

S706. The target SMF network element obtains the information about the plurality of anchor UPF network elements from the source SMF network element, where the plurality of anchor UPF network elements may be a plurality of anchor UPF network elements of the first session.

For example, in the scenario in FIG. 2, the plurality of anchor UPF network elements of the first session include the anchor UPF1 network element 206 and the anchor UPF2 network element 207. In the scenario in FIG. 3, the plurality of anchor UPF network elements of the first session include the anchor UPF1 network element 308, the anchor UPF2 network element 309, and the anchor UPF3 network element 310. When the user equipment establishes a user plane connection in the service area of the source SMF network element, the source SMF network element may obtain the identifiers of the plurality of anchor SMF network elements.

For example, the target SMF network element sends a context obtaining request to the source SMF network element, to request a session management context. Optionally, the context obtaining request includes the identifier of the first session. After receiving the context obtaining request, the source SMF network element sends a context obtaining response to the target SMF network element. The context obtaining response includes the information about the plurality of anchor UPF network elements.

For step S707, refer to the description of step S509 in FIG. 5 or step S609 in FIG. 6. Details are not described herein again.

S708. The target SMF network element sends the information about the plurality of anchor UPF network elements to a branching point, and correspondingly, the branching point receives the information about the plurality of anchor UPF network elements from the target SMF network element.

For example, the target SMF network element establishes an N4 session connection to the branching point, to send the information about the plurality of anchor UPF network elements to the branching point.

According to the method in this embodiment of the present invention, after establishing the first session in the area 1, the user equipment moves to the area 2, and moves to another area from the area 2. In this case, the target SMF network element may obtain the identifier of the source SMF network element by using the AMF network element, and then receive the information about the plurality of anchor UPF network elements of the first session from the source SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, after step S708 is performed, the method further includes steps S709 to S712. For steps S709 to S712, refer to the descriptions of steps S511, S512, S514, S515, and S516 in FIG. 5, or the descriptions of steps S612, S614, S615, and S616 in FIG. 6. Details are not described herein again.

Figure 8:
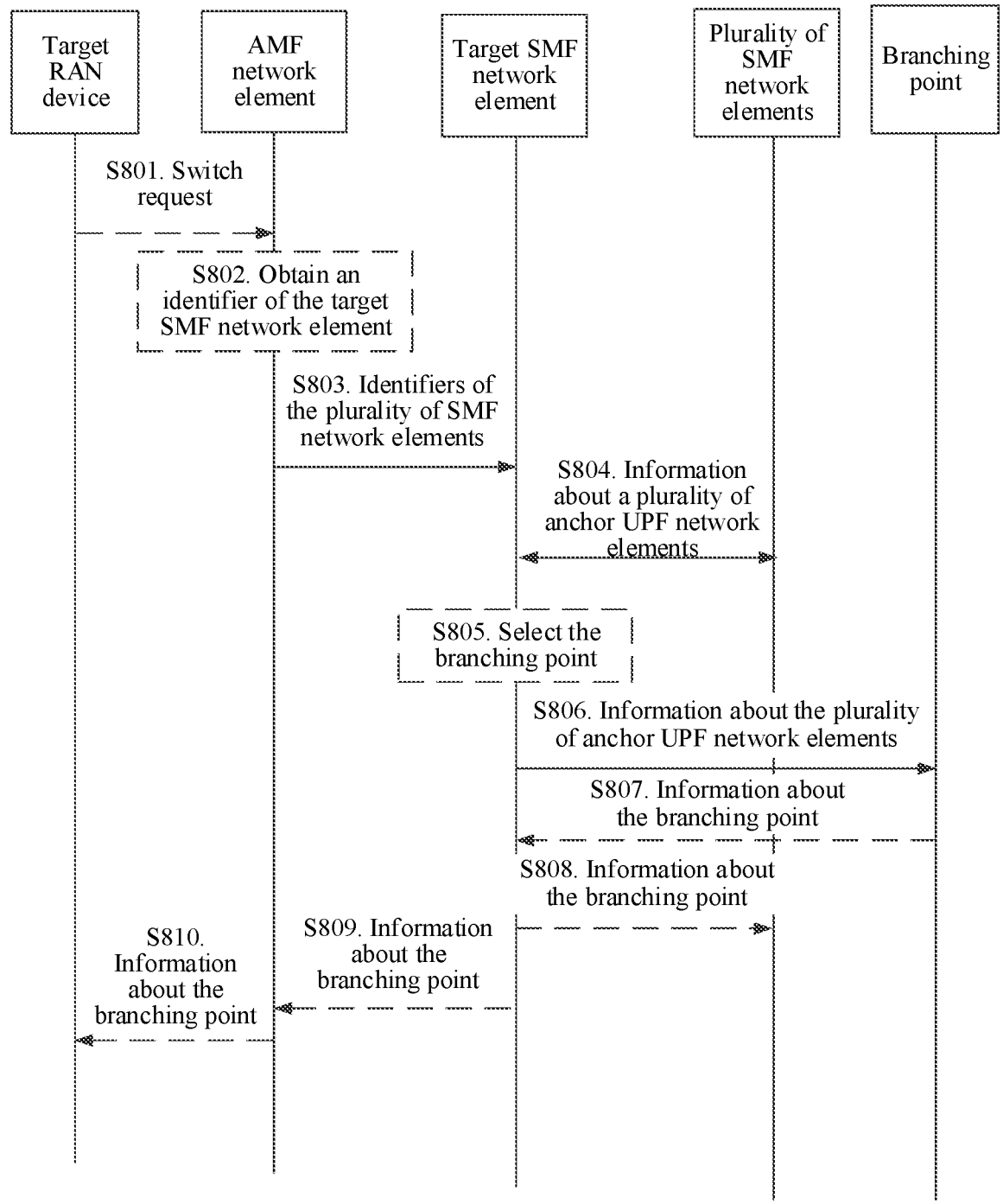
FIG. 8 is a flowchart of another relocation method according to an embodiment of this application.

FIG. 8 is a flowchart of another relocation method according to an embodiment of this application. The method shown in FIG. 8 is used to describe the third possible implementation in step S402 in FIG. 4 in the scenario described in FIG. 2 or FIG. 3. To be specific, when the first identification information includes the identification information of the plurality of SMF network elements that manage the plurality of anchor UPF network elements, the first SMF network element separately receives the information about the plurality of anchor UPF network elements from the plurality of SMF network elements. FIG. 8 is described with reference to FIG. 2, FIG. 3, FIG. 4, and FIG. 5.

For steps S801 and S802, refer to the descriptions of steps S501 and S502 in FIG. 5. Details are not described herein again.

In an example of FIG. 8, the method may further include the following steps.

S803. The AMF network element sends identifiers of the plurality of SMF network elements to the target SMF network element, and correspondingly, the target SMF network element obtains the identifiers of the plurality of SMF network elements from the AMF network element.

For example, the plurality of SMF network elements are the plurality of SMF network elements that manage the plurality of anchor UPF network elements corresponding to the first session. For example, in the scenario in FIG. 2, the plurality of SMF network elements include the first SMF network element 201 and the second SMF network element 202. In the scenario in FIG. 3, the plurality of SMF network elements include the first SMF network element 301, the second SMF network element 302, and the third SMF network element 303.

For example, the AMF network element separately stores the identifiers of the SMF network elements in a process of inserting the plurality of SMF network elements. The AMF network element may send the identifiers of the plurality of SMF network elements to the target SMF network element by using an update session management context request message. Optionally, the update session management context request message further includes the identifier of the first session and the N2 session management information.

S804. The target SMF network element separately obtains the information about the plurality of anchor UPF network elements from the plurality of SMF network elements.

For example, in the scenario in FIG. 2, the plurality of anchor UPF network elements include the anchor UPF1 network element 206 and the anchor UPF2 network element 207. In the scenario in FIG. 3, the plurality of anchor UPF network elements include the anchor UPF1 network element 308, the anchor UPF2 network element 309, and the anchor UPF3 network element 310.

For example, the target SMF network element separately interacts with the plurality of SMF network elements, to obtain the information about the plurality of anchor UPF network elements. For example, the target SMF network element separately sends an N4 session modification request to the plurality of SMF network elements, and the plurality of SMF network elements each return an N4 session modification response to send the information about the anchor UPF network elements that are managed by the plurality of SMF network elements to the target SMF network element.

For step S805, refer to the description of step S509 in FIG. 5. Details are not described herein again. It should be noted that a sequence of performing steps S804 and S805 is not limited in the present invention. When step S805 is performed before S804, the N4 session modification request in S804 further includes the information about the branching point.

S806. The target SMF network element sends the information about the plurality of anchor UPF network elements to the branching point, and correspondingly, the branching point receives the information about the plurality of anchor UPF network elements from the target SMF network element.

For example, the target SMF network element establishes an N4 session connection to the branching point, to send the information about the plurality of anchor UPF network elements to the branching point. According to the method in this embodiment of the present invention, after establishing the first session in the area 1, the user equipment moves to the area 2, and moves to another area from the area 2. In this case, the target SMF network element may obtain the identifiers of the plurality of SMF network elements by using the AMF network element, and then separately receive, from the plurality of SMF network elements, the information about the plurality of anchor UPF network elements that are managed by the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, if the target SMF network element does not obtain the information about the branching point in step S805, the method further includes steps S807 and S808. For step S807, refer to the description of step S511 in FIG. 5. Details are not described herein again.

S808. The target SMF network element separately sends the information about the branching point to the plurality of SMF network elements, and correspondingly, the plurality of SMF network elements separately receive the information about the branching point from the target SMF network element.

For example, the plurality of SMF network elements obtain the information about the branching point, and send the information about the branching point to the anchor UPF network elements that are managed by the SMF network elements, so that the anchor UPF network elements can obtain the information about the branching point. In this way, a service flow is forwarded from the anchor UPF network element to the branching point.

Optionally, after step S806 is performed, the method further includes steps S809 and S810. For steps S809 and S810, refer to the descriptions of steps S514 and S515 in FIG. 5. Details are not described herein again.

Figure 9:
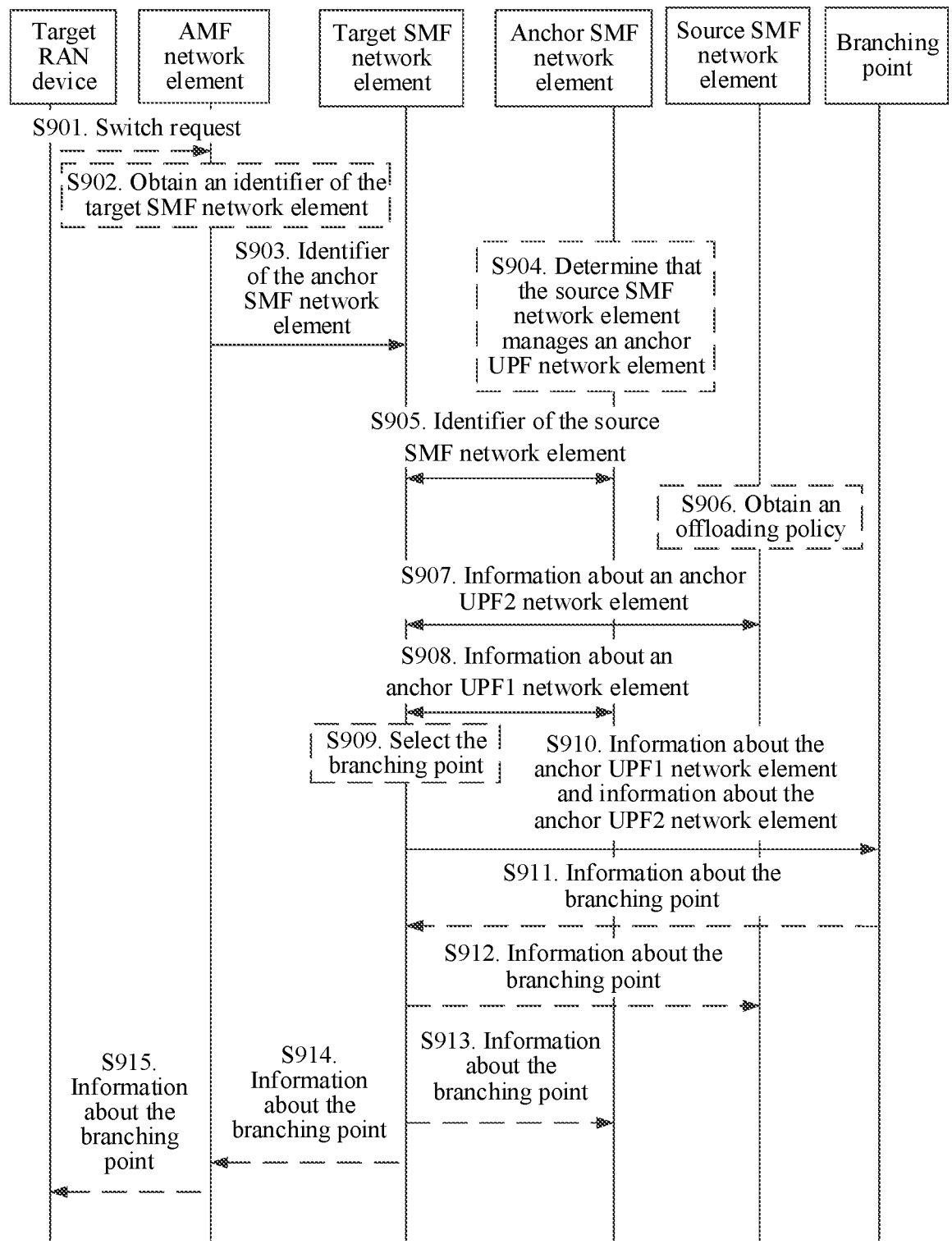
FIG. 9 is a flowchart of another relocation method according to an embodiment of this application.

FIG. 9 is a flowchart of another relocation method according to an embodiment of this application. The method shown in FIG. 9 is used to describe the fourth possible implementation in step S402 in FIG. 4 in the scenario described in FIG. 2. To be specific, when the first identification information includes the identification information of the anchor SMF network element, the first SMF network element receives, from the anchor SMF network element, the identification information of the plurality of SMF network elements that manage the plurality of anchor UPF network elements, and separately receives the information about the plurality of anchor UPF network elements from the plurality of SMF network elements. FIG. 9 is described with reference to FIG. 2, FIG. 4, and FIG. 5.

For steps S901 and S902, refer to the descriptions of steps S501 and S502 in FIG. 5. Details are not described herein again.

In an example of FIG. 9, the method may further include the following steps.

S903. The AMF network element sends an identifier of an anchor SMF network element to the target SMF network element, and correspondingly, the target SMF network element receives the identifier of the anchor SMF network element from the AMF network element.

For example, the AMF network element stores the identifier of the anchor SMF network element in a process of inserting a source SMF network element. The AMF network element may send the identifier of the anchor SMF network element to the target SMF network element by using an update session management context request message. Optionally, the update session management context request message further includes the identifier of the first session and the N2 session management information.

S905. The target SMF network element obtains an identifier of the source SMF network element from the anchor SMF network element.

For example, the anchor SMF network element is the first SMF network element 201 in FIG. 2. The anchor SMF network element obtains the identifier of the source SMF network element in the process of inserting the source SMF network element.

For example, the target SMF network element sends a context obtaining request to the anchor SMF network element, to request a session management context. Optionally, the context obtaining request includes the identifier of the first session. After receiving the context obtaining request, the anchor SMF network element sends a context obtaining response to the target SMF network element. The context obtaining response includes the identifier of the source SMF network element.

Optionally, the target SMF network element further obtains the identifier of the anchor SMF network element from the anchor SMF network element.

For steps S906 to S910, refer to the descriptions of steps S506 to S510 in FIG. 5. Details are not described herein again.

According to the method in this embodiment of the present invention, in the scenario shown in FIG. 2, after establishing the first session in the area 1, the user equipment moves to the area 2, and continues to move to another area from the area 2. In this case, the target SMF network element may obtain the identifier of the anchor SMF network element by using the AMF network element, receive the identifier of the source SMF network element from the anchor SMF network element, and separately receive the information about the plurality of anchor UPF network elements from the source SMF network element and the anchor SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, in a process of performing step S905, the anchor SMF network element performs step S904.

S904. The anchor SMF network element determines that the source SMF network element manages the anchor UPF network element.

It should be noted that the anchor SMF network element determines that the source SMF network element manages the anchor UPF network element. Because both the anchor UPF network element and the branching point are managed by the source SMF network element, it may be further understood that the anchor SMF network element determines that the source SMF network element manages the branching point.

For example, the anchor SMF network element may determine, in either of the following two manners, that the source SMF network element manages the anchor UPF network element.

In a first possible manner, after receiving the context obtaining request sent by the target SMF network element, the anchor SMF network element sends a query request to the source SMF network element. The query request is used to query whether the source SMF network element manages the anchor UPF network element. The source SMF network element returns a query response message to the anchor SMF network element. The query response message includes indication information, and the indication information is used to indicate that the source SMF network element manages the anchor UPF network element.

In a second possible manner, in a process of inserting the first branching point 204 in the area 2 described in FIG. 2, the source SMF network element sends indication information to the anchor SMF network element. The indication information is used to indicate that the source SMF network element manages the anchor UPF network element. For example, the indication information may be carried in an N16 message. The indication information may be ULCL tunnel information (ULCL tunnel information), or may be a newly defined parameter.

Optionally, after step S910 is performed, the method further includes steps S911 to S915. For steps S911 to S915, refer to the descriptions of steps S511 to S515 in FIG. 5. Details are not described herein again.

Figure 10:
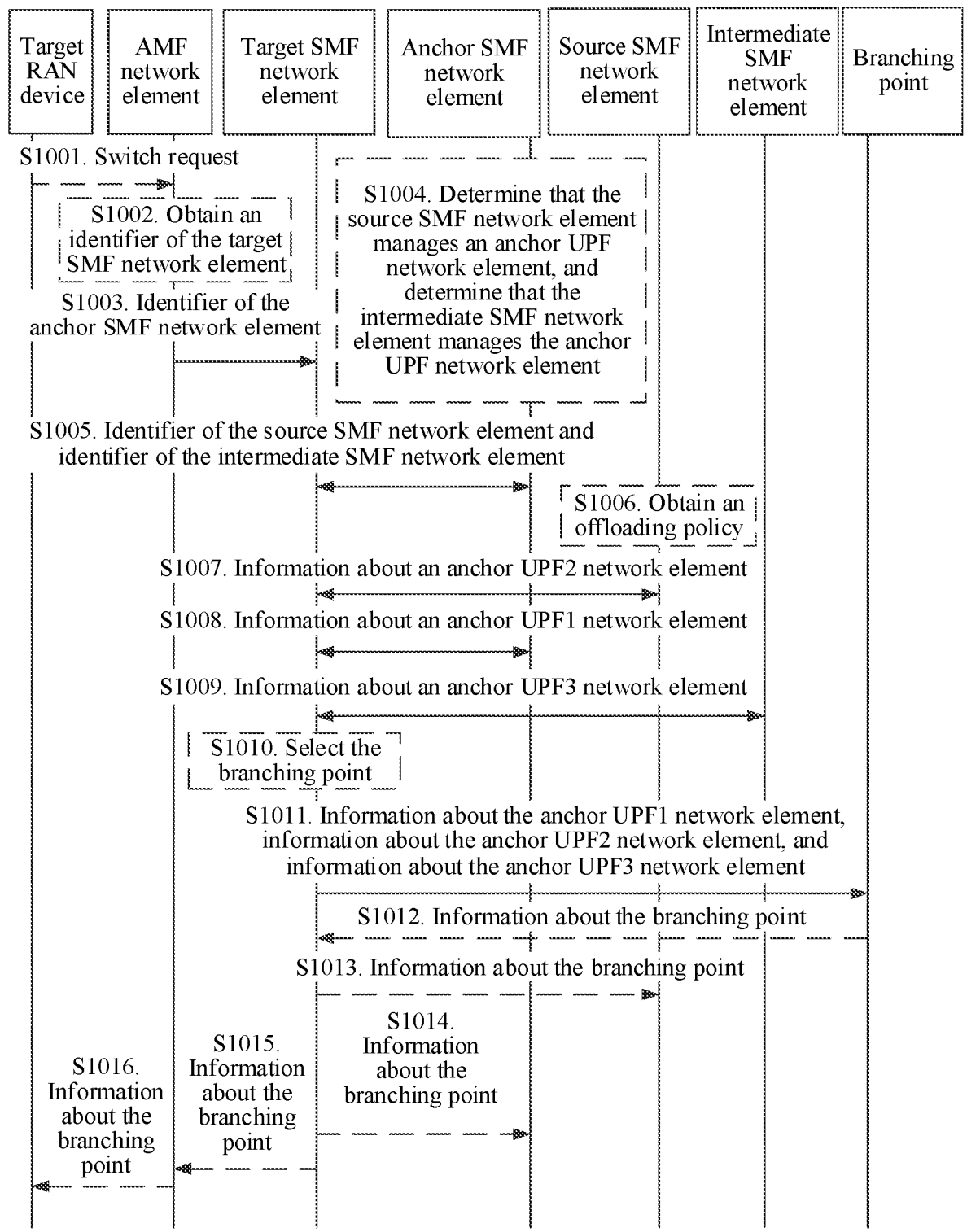
FIG. 10 is a flowchart of another relocation method according to an embodiment of this application.

FIG. 10 is a flowchart of another relocation method according to an embodiment of this application. The method shown in FIG. 10 is used to describe the fourth possible implementation in step S402 in FIG. 4 in the scenario described in FIG. 3. To be specific, when the first identification information includes the identification information of the anchor SMF network element, the first SMF network element receives, from the anchor SMF network element, the identification information of the plurality of SMF network elements that manage the plurality of anchor UPF network elements, and separately receives the information about the plurality of anchor UPF network elements from the plurality of SMF network elements. FIG. 10 is described with reference to FIG. 3, FIG. 4, FIG. 6, and FIG. 9.

For steps S1001 to S1003, refer to the descriptions of steps S901 to S903 in FIG. 9. Details are not described herein again.

In an example of FIG. 10, the method may further include the following steps.

S1005. The target SMF network element obtains the identifier of the source SMF network element and an identifier of an intermediate SMF network element from an anchor SMF network element.

For example, the anchor SMF network element may obtain the identifier of the source SMF network element in a process of inserting the source SMF network element, and the anchor SMF network element may obtain the identifier of the intermediate SMF network element in a process of inserting the intermediate SMF network element.

For example, the target SMF network element sends a context obtaining request to the anchor SMF network element, to request to obtain a session management context. Optionally, the context obtaining request includes the identifier of the first session. After receiving the context obtaining request, the anchor SMF network element sends a context obtaining response to the target SMF network element. The context obtaining response includes the identifier of the source SMF network element and the identifier of the intermediate SMF network element.

Optionally, the target SMF network element further obtains an identifier of the anchor SMF network element from the anchor SMF network element.

For steps S1006 to S1011, refer to the descriptions of steps S506 to S5011 in FIG. 5. Details are not described herein again.

According to the method in this embodiment of the present invention, in the scenario shown in FIG. 3, after establishing the first session in the area 1, the user equipment moves to the area 2, moves to the area 3 from the area 2, and moves to another area from the area 3. In this case, the target SMF network element may obtain the identifier of the anchor SMF network element by using the AMF network element, receive the identifier of the source SMF network element and the identifier of the intermediate SMF network element from the anchor SMF network element, and separately receive the information about the plurality of anchor UPF network elements from the source SMF network element, the anchor SMF network element, and the intermediate SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, in a process of performing step S1005, the anchor SMF network element performs step S1004.

S1004. The anchor SMF network element determines that the source SMF network element manages the anchor UPF network element, and the anchor SMF network element determines that the intermediate SMF network element manages the anchor UPF network element.

It should be noted that the anchor SMF network element determines that the source SMF network element manages the anchor UPF network element. Because both the anchor UPF network element and the branching point in the area 1 are managed by the source SMF network element, it may be further understood that the anchor SMF network element determines that the source SMF network element manages the branching point. The anchor SMF network element determines that the intermediate SMF network element manages the anchor UPF network element. Because both the anchor UPF network element and the branching point in the area 2 are managed by the intermediate SMF network element, it may be further understood that the anchor SMF network element determines that the intermediate SMF network element manages the branching point.

For example, for a process in which the anchor SMF network element determines that the source SMF network element manages the anchor UPF network element, refer to the description of step S904 in FIG. 9. Details are not described herein again.

For example, the anchor SMF network element may determine, in either of the following two manners, that the intermediate SMF network element manages the anchor UPF network element.

In a first possible manner, after receiving the context obtaining request sent by the target SMF network element, the anchor SMF network element sends a query request to the intermediate SMF network element. The query request is used to query whether the intermediate SMF network element manages the anchor UPF network element. The intermediate SMF network element returns a query response message to the anchor SMF network element. The query response message includes indication information, and the indication information is used to indicate that the intermediate SMF network element manages the anchor UPF network element.

In a second possible manner, in a process of inserting the first branching point 305 in the area 2 described in FIG. 3, the intermediate SMF network element sends indication information to the anchor SMF network element. The indication information is used to indicate that the intermediate SMF network element manages the anchor UPF network element. For example, the indication information may be carried in an N16 message. The indication information may be ULCL tunnel information, or may be a newly defined parameter.

For example, when the anchor SMF network element determines that the source SMF network element manages the anchor UPF network element, in step S1005, the context obtaining response sent by the anchor SMF network element to the target SMF network element includes the identifier of the source SMF network element, so that the target SMF network element can obtain, from the source SMF network element, the anchor UPF network element managed by the source SMF network element. When the anchor SMF network element determines that the intermediate SMF network element manages the anchor UPF network element, in step S1005, the context obtaining response sent by the anchor SMF network element to the target SMF network element includes the identifier of the intermediate SMF network element, so that the target SMF network element can obtain, from the intermediate SMF network element, the anchor UPF network element managed by the intermediate SMF network element.

For example, when the anchor SMF network element determines that the source SMF network element and the intermediate SMF network element manage the anchor UPF network element, the target SMF network element obtains the information about the anchor UPF2 from the source SMF network element in step S1007, and obtains the information about the anchor UPF3 from the intermediate SMF network element in step S1009. When the anchor SMF network element determines that the source SMF network element does not manage the anchor UPF network element, the target SMF network element cannot obtain the information about the anchor UPF network element from the source network element, and therefore may not perform S1007. Alternatively, when the anchor SMF network element determines that the intermediate SMF network element does not manage the anchor UPF network element, the target SMF network element cannot obtain the information about the anchor UPF network element from the intermediate SMF network element, and therefore may not perform S1009. In this way, signaling overheads can be reduced.

Optionally, after step S1011 is performed, the method further includes steps S1012 to S1016. For steps S1012 to S1016, refer to the descriptions of steps S612 to S616 in FIG. 6. Details are not described herein again.

Figure 11:
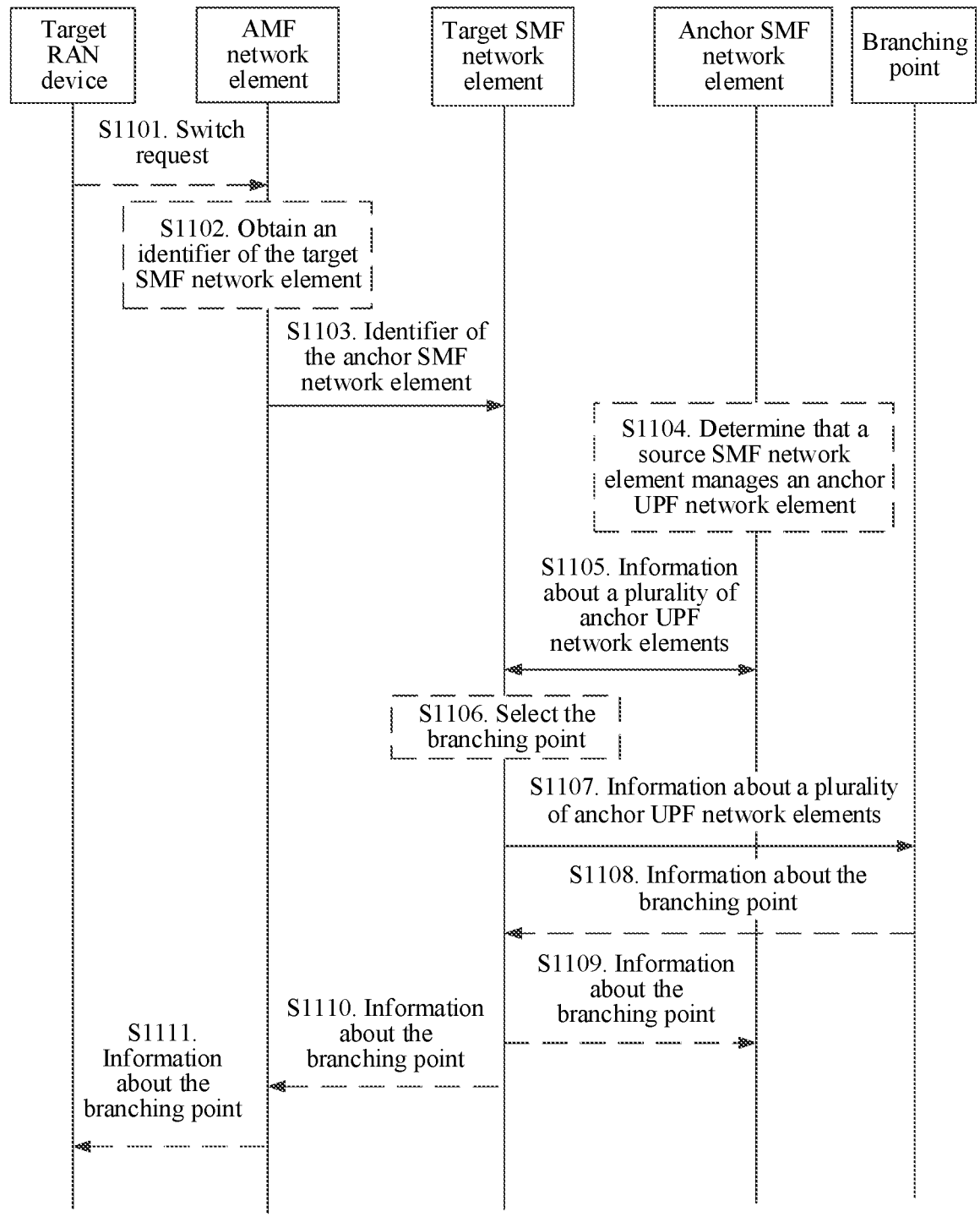
FIG. 11 is a flowchart of another relocation method according to an embodiment of this application.

FIG. 11 is a flowchart of another relocation method according to an embodiment of this application. The method shown in FIG. 11 is used to describe the fifth possible implementation in step S402 in FIG. 4 in the scenario described in FIG. 2 or FIG. 3. To be specific, when the first identification information includes the identification information of the anchor SMF network element, the first SMF network element receives the information about the plurality of anchor UPF network elements from the anchor SMF network element. FIG. 11 is described with reference to FIG. 2, FIG. 3, FIG. 4, FIG. 9, and FIG. 7.

For steps S1101 to S1103, refer to the descriptions of steps S901 to S903 in FIG. 9. Details are not described herein again.

In an example of FIG. 11, the method may further include the following step:

S1105. The target SMF network element obtains the information about the plurality of anchor UPF network elements from the anchor SMF network element, where the plurality of anchor UPF network elements may be a plurality of anchor UPF network elements of the first session.

For example, in the scenario in FIG. 2, the plurality of anchor UPF network elements of the first session include the anchor UPF1 network element 206 and the anchor UPF2 network element 207. Because the anchor UPF1 network element 206 is managed by the anchor SMF network element, the anchor SMF network element may obtain information about the anchor UPF1 network element 206. The anchor SMF network element may obtain information about the anchor UPF2 network element 207 in either of the following two manners: (1) The anchor SMF network element sends a context obtaining request to the second SMF network element 202. After determining that the second SMF network element 202 manages the branching point, the second SMF network element 202 sends the information about the anchor UPF2 network element 207 to the anchor SMF network element by using a context obtaining response. (2) In a process of inserting the first branching point 204, the second SMF network element 202 sends the information about the anchor UPF2 network element to the anchor SMF network element 207. In this case, the anchor SMF network element 207 obtains the information about the anchor UPF2 network element.

For example, in the scenario in FIG. 3, the plurality of anchor UPF network elements of the first session include the anchor UPF1 network element 308, the anchor UPF2 network element 309, and the anchor UPF3 network element 310. Because the anchor UPF1 network element 308 is managed by the anchor SMF network element, the anchor SMF network element may obtain the information about the anchor UPF1 network element 308. The anchor SMF network element may obtain the information about the anchor UPF2 network element 309 and the information about the anchor UPF3 network element 310 in either of the two manners in the scenario in FIG. 2 in which the anchor SMF network element obtains the information about the anchor UPF2 network element 207.

For example, after the anchor SMF network element obtains the information about the plurality of anchor UPF network elements, the target SMF network element sends a context obtaining request to the anchor SMF network element, to request to obtain a session management context. Optionally, the context obtaining request includes the identifier of the first session. After receiving the context obtaining request, the anchor SMF network element sends a context obtaining response to the target SMF network element. The context obtaining response includes the information about the plurality of anchor UPF network elements.

For steps S1106 and S1107, refer to the descriptions of steps S707 and S708 in FIG. 7. Details are not described herein again.

According to the method in this embodiment of the present invention, after establishing the first session in the area 1, the user equipment moves to the area 2, and moves to another area from the area 2. In this case, the target SMF network element may obtain the identifier of the anchor SMF network element by using the AMF network element, and then receive the information about the plurality of anchor UPF network elements of the first session from the anchor SMF network element. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after the user equipment moves. This improves user experience.

Optionally, in a process of performing step S1105, the anchor SMF network element performs step S1104. For step S1104, refer to the description of step S904 in FIG. 9. Details are not described herein again.

Optionally, after step S1107 is performed, the method further includes steps S1108 to S1111. For steps S1108 to S1111, refer to the descriptions of steps S709 to S712 in FIG. 7. Details are not described herein again.

In the foregoing embodiments provided in this application, the solutions of the relocation method provided in the embodiments of this application are separately described from perspectives of network elements and interaction between the network elements. It may be understood that, to implement the foregoing functions, the network elements and the devices such as the first session management function network element, the second session management function network element, and the access and mobility management function network element include corresponding hardware structures and/or software modules for performing the functions. A person of ordinary skill in the art should easily be aware that, in combination with the examples described in the embodiments disclosed in this specification, units and algorithms steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12A:
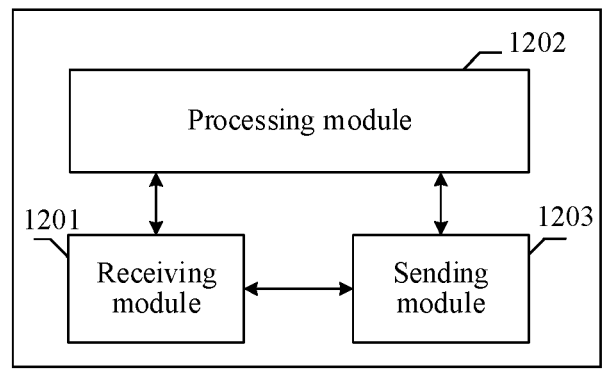
FIG. 12A and FIG. 12B are schematic structural diagrams of a relocation apparatus according to an embodiment of this application.

For example, when the foregoing network elements implement the corresponding functions by using the software modules, as shown in FIG. 12A, a relocation apparatus may include a receiving module 1201, a processing module 1202, and a sending module 1203.

In an embodiment, the relocation apparatus may be configured to perform operations of the first session management function network element (for example, the first SMF network element) in FIG. 4 and the target SMF network element in FIG. 5 to FIG. 11. An example is as follows:

The receiving module 1201 is configured to receive first identification information from an access and mobility management function network element (for example, the AMF network element). The processing module 1202 is configured to obtain information about a plurality of anchor user plane function network elements (for example, the anchor UPF network elements) of a first session based on the first identification information. The sending module 1203 is configured to send the information about the plurality of anchor user plane function network elements to a branching point. The branching point is a user plane function network element that is managed by the relocation apparatus and that has a function of diverting traffic.

Therefore, according to the relocation apparatus in this embodiment of the present invention, after establishing the first session in an area 1, user equipment moves to an area 2, and continues to move to another area from the area 2. In this case, the relocation apparatus may obtain information about a plurality of anchor UPF network elements in an area accessed by the user equipment, and deliver the information about the plurality of anchor UPF network elements to the branching point managed by the relocation apparatus, so that the branching point can obtain the information about the plurality of anchor UPF network elements. A user plane connection between the branching point and each of the plurality of anchor UPF network elements is established in a target area to which the user equipment moves, to ensure that the first session is not interrupted after the user equipment moves. This improves user experience.

Optionally, the relocation apparatus is a target session management function network element in a session management function network element relocation process, and the first identification information includes an identifier of a source session management function network element in the session management function network element relocation process.

Optionally, the receiving module 1201 is configured to receive, from the source session management function network element, identification information of a plurality of session management function network elements that manage the plurality of anchor user plane function network elements. The receiving module 1201 is configured to separately receive the information about the plurality of anchor user plane function network elements from the plurality of session management function network elements.

Optionally, the receiving module 1201 is configured to receive the information about the plurality of anchor user plane function network elements from the source session management function network element.

Optionally, the first identification information includes identification information of a plurality of session management function network elements that manage the plurality of anchor user plane function network elements.

Optionally, the receiving module 1201 is configured to separately receive the information about the plurality of anchor user plane function network elements from the plurality of session management function network elements.

Optionally, the first identification information includes identification information of an anchor session management function network element that provides a session management service for the first session when the first session is established.

Optionally, the receiving module 1201 is configured to receive, from the anchor session management function network element, identification information of a plurality of session management function network elements that manage the plurality of anchor user plane function network elements. The receiving module 1201 is configured to separately receive the information about the plurality of anchor user plane function network elements from the plurality of session management function network elements.

Optionally, the receiving module 1201 is configured to receive the information about the plurality of anchor user plane function network elements from the anchor session management function network element.

Optionally, the processing module 1202 is further configured to obtain an offloading policy of the first session based on the first identification information. The sending module 1203 is further configured to send the offloading policy to the branching point.

In addition, the receiving module 1201, the processing module 1202, and the sending module 1203 in the foregoing relocation apparatus may further implement other operations or functions of the first SMF network element in FIG. 4 and the target SMF network element in FIG. 5 to FIG. 11 in the foregoing method. Details are not described herein again.

In another embodiment, the relocation apparatus shown in FIG. 12A may be further configured to perform operations of the source SMF network element in FIG. 5 and FIG. 6 and the anchor SMF network element in FIG. 9 and FIG. 10. An example is as follows:

The processing module 1202 is configured to obtain identification information of a plurality of session management function network elements that manage a plurality of anchor user plane function network elements of a first session. The sending module 1203 is configured to send the identification information of the plurality of session management function network elements to a first session management function network element. The identification information of the plurality of session management function network elements is used to obtain information about the plurality of anchor user plane function network elements. The information about the plurality of anchor user plane function network elements is used to establish a connection between a branching point and each of the plurality of anchor user plane function network elements. The branching point is a user plane function network element that is managed by the first session management function network element and that has a function of diverting traffic.

Therefore, according to the relocation apparatus in this embodiment of the present invention, after establishing the first session in an area 1, user equipment moves to an area 2, and continues to move to another area from the area 2. In this case, the relocation apparatus sends the identification information of the plurality of SMF network elements to the target SMF network element, so that the branching point managed by the target SMF network element can obtain information about a plurality of anchor UPF network elements in an area accessed by the user equipment. A user plane connection between the branching point and each of the plurality of anchor UPF network elements is established in a target area to which the user equipment moves, to ensure that the first session is not interrupted after the user equipment moves. This improves user experience.

Optionally, before the sending module 1203 sends the identification information of the plurality of session management function network elements to the first session management function network element, the processing module 1202 is further configured to determine that the plurality of session management function network elements respectively manage the plurality of anchor user plane function network elements.

Optionally, the relocation apparatus is an anchor session management function network element that provides a session management service for the first session when the first session is established.

Optionally, the first session management function network element is a target session management function network element in a session management function network element relocation process, and the relocation apparatus is a source session management function network element in the session management function network element relocation process.

Optionally, the sending module 1203 is further configured to send an offloading policy of the first session to the first session management function network element.

In addition, the receiving module 1201, the processing module 1202, and the sending module 1203 in the foregoing relocation apparatus may further implement other operations or functions of the source SMF network element in FIG. 5 and FIG. 6 and the anchor SMF network element in FIG. 9 and FIG. 10 in the foregoing method. Details are not described herein again.

In another embodiment, the relocation apparatus shown in FIG. 12A may be further configured to perform operations of the source SMF network element in FIG. 7 and the anchor SMF network element in FIG. 11. An example is as follows:

The processing module 1202 obtains information about a plurality of anchor user plane function network elements of a first session. The sending module 1203 sends the information about the plurality of anchor user plane function network elements to a first session management function network element. The information about the plurality of anchor user plane function network elements is used to establish a connection between a branching point and each of the plurality of anchor user plane function network elements. The branching point is a user plane function network element that is managed by the first session management function network element and that has a function of diverting traffic.

Therefore, according to the relocation apparatus in this embodiment of the present invention, the relocation apparatus sends identifiers of the plurality of anchor UPF network elements to the target SMF network element, so that after sending the information about the plurality of anchor UPF network elements to the branching point managed by the target SMF network element, the target SMF network element can establish a user plane connection between the branching point and each of the plurality of anchor UPF network elements. In this way, it is ensured that the first session including the plurality of anchor UPF network elements is not interrupted after user equipment moves, so as to improve user experience.

Optionally, the relocation apparatus is an anchor session management function network element that provides a session management service for the first session when the first session is established.

Optionally, the first session management function network element is a target session management function network element in a session management function network element relocation process, and the relocation apparatus is a source session management function network element in the session management function network element relocation process.

Optionally, the sending module 1203 further sends an offloading policy of the first session to the first session management function network element.

In addition, the receiving module 1201, the processing module 1202, and the sending module 1203 in the foregoing relocation apparatus may further implement other operations or functions of the source SMF network element in FIG. 7 and the anchor SMF network element in FIG. 11 in the foregoing method. Details are not described herein again.

In another embodiment, the relocation apparatus shown in FIG. 12A may be further configured to perform operations of the AMF network element in FIG. 8. An example is as follows:

The processing module 1202 obtains identification information of a plurality of session management function network elements that manage the plurality of anchor user plane function network elements of a first session. The sending module 1203 sends the identification information of the plurality of session management function network elements to a first session management function network element. The identification information of the plurality of session management function network elements is used to obtain information about the plurality of anchor user plane function network elements. The information about the plurality of anchor user plane function network elements is used to establish a connection between a branching point and each of the plurality of anchor user plane function network elements. The branching point is a user plane function network element that is managed by the first session management function network element and that has a function of diverting traffic.

Therefore, according to the relocation apparatus in this embodiment of the present invention, the target SMF network element may obtain identifiers of the plurality of SMF network elements by using the relocation apparatus, and then separately receive, from the plurality of SMF network elements, the information about the plurality of anchor UPF network elements that are managed by the plurality of SMF network elements. After sending the information about the plurality of anchor UPF network elements to the branching point managed by the target SMF network element, the target SMF network element may establish a user plane connection between the branching point and each of the plurality of anchor UPF network elements, to ensure that the first session including the plurality of anchor UPF network elements is not interrupted after user equipment moves. This improves user experience.

Optionally, before the sending module 1203 sends the identification information of the plurality of session management function network elements to the first session management function network element, the processing module 1202 is further configured to determine that the plurality of session management function network elements respectively manage the plurality of anchor user plane function network elements.

In addition, the receiving module 1201, the processing module 1202, and the sending module 1203 in the foregoing relocation apparatus may further implement other operations or functions of the AMF network element in FIG. 8 in the foregoing method. Details are not described herein again.

Figure 12B:
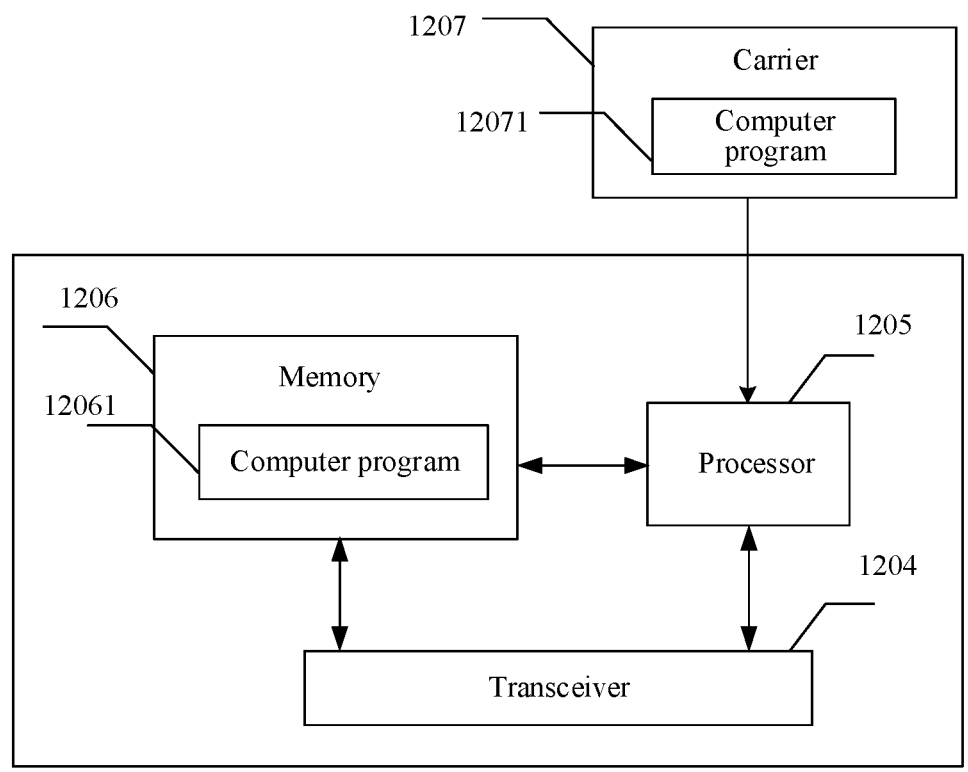

FIG. 12B is another possible schematic structural diagram of the relocation apparatus in the foregoing embodiment. As shown in FIG. 12B, the relocation apparatus includes a transceiver 1204 and a processor 1205. For example, the processor 1205 may be a general-purpose microprocessor, a data processing circuit, an application-specific integrated circuit (application specific integrated circuit, ASIC), or a field-programmable gate array (field-programmable gate arrays, FPGA) circuit. The relocation apparatus may further include a memory 1206. For example, the memory is a random access memory (random access memory, RAM). The memory is configured to be coupled to the processor 1205, and the memory stores a computer program 12061 necessary for the relocation apparatus.

In addition, the relocation method in the foregoing embodiment further provides a carrier 1207. The carrier stores a computer program 12071 of the relocation apparatus, and the computer program 12071 may be loaded to the processor 1205. The carrier may be an optical signal, an electrical signal, an electromagnetic signal, or a computer readable storage medium (for example, a hard disk).

When the computer program 12061 or 12071 is run on a computer (for example, the processor 1205), the computer may be enabled to perform the foregoing method.

For example, in an embodiment, the processor 1205 is configured to perform other operations or functions of a target SMF network element. The transceiver 1204 is configured to implement communication between the relocation apparatus and a branching point/an AMF network element/another SMF network element.

In another embodiment, the processor 1205 is configured to perform other operations or functions of the source SMF network element in FIG. 5 and FIG. 6 and the anchor SMF network element in FIG. 9 and FIG. 10. The transceiver 1204 is configured to implement communication between the relocation apparatus and a target SMF network element.

In another embodiment, the processor 1205 is configured to perform other operations or functions of the source SMF network element in FIG. 7 and the anchor SMF network element in FIG. 11. The transceiver 1204 is configured to implement communication between the relocation apparatus and a target SMF network element.

In another embodiment, the processor 1205 is configured to perform other operations or functions of the AMF network element in FIG. 8. The transceiver 1204 is configured to implement communication between the relocation apparatus and a target SMF network element.

The controller/processor configured to perform the foregoing relocation apparatus in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logic blocks, modules, and circuits described with reference to content disclosed in this application. Alternatively, the processor may be a combination of processors implementing a computing function, for example, a combination of one or more microprocessors, or a combination of a DSP and a microprocessor.

Method or algorithm steps described in combination with the content disclosed in this application may be implemented by using hardware, or may be implemented by using a processor by executing a software instruction. The software instruction may include a corresponding software module. The software module may be located in a RAM, a flash memory, a ROM, an EPROM, an EEPROM, a register, a hard disk, a removable hard disk, a CD-ROM, or a storage medium of any other form that is well-known in the art. For example, a storage medium is coupled to the processor, so that the processor can read information from the storage medium, and write information into the storage medium. Certainly, the storage medium may alternatively be a component of the processor. The processor and the storage medium may be located in an ASIC. In addition, the ASIC may be located in a radio access network device. Certainly, the processor and the storage medium may alternatively exist in the relocation apparatus as discrete components.

All or some of the foregoing embodiments may be implemented by means of software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the processes or functions according to the embodiments of the present invention are all or partially generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid state disk (Solid State Disk) (SSD)), or the like.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method for network element relocation, comprising:
   receiving, by a target intermediate session management function (SMF) network element, identification information of a source intermediate SMF network element from an access and mobility management function (AMF) network element;
   receiving, by the target intermediate SMF network element, an identifier of an anchor SMF network element from the source intermediate SMF network element identified by the identification of the source intermediate SMF network element, wherein the anchor SMF network element provides a session management service for a packet data unit (PDU) session;
   obtaining, by the target intermediate SMF network element, information about a plurality of anchor user plane function (UPF) network elements of the PDU session separately from the source intermediate SMF network element and the anchor SMF network element, wherein each of the plurality of anchor UPF network elements is used as an Internet protocol (IP) anchor of a user equipment (UE) in the PDU session; and
   sending, by the target intermediate SMF network element, the information to a branching point, wherein the branching point is a UPF network element managed by the target intermediate SMF network element and the branching point is capable of diverting traffic.

2. The method according to claim 1, wherein the obtaining the information about the plurality of anchor UPF network elements comprises:
   receiving, by the target intermediate SMF network element from the source intermediate SMF network element, identification information of a plurality of SMF network elements that manage the plurality of anchor UPF network elements; and
   obtaining, by the target intermediate SMF network element, the information about the plurality of anchor UPF network elements from the plurality of SMF network elements.

3. The method according to claim 1, further comprising:
   sending, by the target intermediate SMF network element, an N4 session establishment request to the branching point; and
   receiving, by the target intermediate SMF network element, an N4 session establishment response from the branching point, wherein the N4 session establishment response comprises information about the branching point.

4. The method according to claim 3, further comprising:
   sending, by the target intermediate SMF network element, the information about the branching point to the anchor SMF network element.

5. The method according to claim 3, further comprising:
   sending, by the target intermediate SMF network element, the information about the branching point to the source intermediate SMF network element.

6. The method according to claim 1, further comprising:
   obtaining, by a target intermediate SMF network element, an offloading policy of the session based on the identification information; and
   sending, by the target intermediate SMF network element, the offloading policy to the branching point.

7. An apparatus for network element relocation, comprising:
   at least one processor;
   a transceiver; and
   a memory coupled to the at least one processor and storing programming instructions for execution by the at least one processor, the programming instructions instruct the at least one processor to:
   receive, through the transceiver, identification information of a source intermediate session management function (SMF) network element from an access and mobility management function (AMF) network element;
   receive an identifier of an anchor SMF network element from the source intermediate SMF network element identified by the identification of the source intermediate SMF network element, wherein the anchor SMF network element provides a session management service for a packet data unit (PDU) session;
   obtain information about a plurality of anchor user plane function (UPF) network elements of the PDU session separately from the source intermediate SMF network element and the anchor SMF network element, wherein each of the plurality of anchor UPF network elements is used as an Internet protocol (IP) anchor of a user equipment (UE) in the PDU session; and
   send, through the transceiver, the information to a branching point, wherein the branching point is a UPF network element managed by the apparatus and the branching point is capable of diverting traffic.

8. The apparatus according to claim 7, wherein the programming instructions further instruct the at least one processor to:
   receive, from the source intermediate SMF network element, identification information of a plurality of SMF network elements that manage the plurality of anchor UPF network elements; and obtain the information about the plurality of anchor UPF network elements from the plurality of SMF network elements.

9. The apparatus according to claim 7, wherein the programming instructions further instruct the at least one processor to:
send an N4 session establishment request to the branching point; and
receive an N4 session establishment response from the branching point, wherein the N4 session establishment response comprises information about the branching point.

10. The apparatus according to claim 9, wherein the programming instructions further instruct the at least one processor to send the information about the branching point to the anchor SMF network element.

11. The apparatus according to claim 9, wherein the programming instructions further instruct the at least one processor to send the information about the branching point to the source intermediate SMF network element.

12. The apparatus according to claim 7, wherein the programming instructions further instruct the at least one processor obtain an offloading policy of the session based on the identification information; and
send, through the transceiver, the offloading policy to the branching point.

13. A non-transitory, computer-readable medium storing one or more instructions executable by at least one processor to perform operations comprising:
receiving, by a target intermediate session management function (SMF) network element, identification information of a source intermediate SMF network element from an access and mobility management function (AMF) network element;
receiving, by the target intermediate SMF network element, an identifier of an anchor SMF network element from the source intermediate SMF network element identified by the identification of the source intermediate SMF network element, wherein the anchor SMF network element provides a session management service for a packet data unit (PDU) session;
obtaining, by the target intermediate SMF network element, information about a plurality of anchor user plane function (UPF) network elements of the PDU session separately from the source intermediate SMF network element and the anchor SMF network element, wherein each of the plurality of anchor UPF network elements is used as an Internet protocol (IP) anchor of a user equipment (UE) in the PDU session; and
sending, by the target intermediate SMF network element, the information to a branching point, wherein the branching point is a UPF network element managed by the target intermediate SMF network element and the branching point is capable of diverting traffic.

14. The non-transitory, computer-readable medium according to claim 13, wherein the obtaining the information about the plurality of anchor UPF network elements comprises:
receiving, by the target intermediate SMF network element from the source intermediate SMF network element, identification information of a plurality of SMF network elements that manage the plurality of anchor UPF network elements; and
obtaining, by the target intermediate SMF network element, the information about the plurality of anchor UPF network elements from the plurality of SMF network elements.

15. The non-transitory, computer-readable medium according to claim 13, further comprising:
sending, by the target intermediate SMF network element, an N4 session establishment request to the branching point; and
receiving, by the target intermediate SMF network element, an N4 session establishment response from the branching point, wherein the N4 session establishment response comprises information about the branching point.

16. The non-transitory, computer-readable medium according to claim 15, further comprising:
sending, by the target intermediate SMF network element, the information about the branching point to the anchor SMF network element; and
sending, by the target intermediate SMF network element, the information about the branching point to the source intermediate SMF network element.

17. The non-transitory, computer-readable medium according to claim 13, further comprising:
obtaining, by a target intermediate SMF network element, an offloading policy of the session based on the identification information; and
sending, by the target intermediate SMF network element, the offloading policy to the branching point.

18. The method according to claim 1, wherein the plurality of anchor UPF network element comprises a first anchor UPF network element managed by the anchor SMF network element and a second anchor UPF network element managed by the source intermediate SMF network element, and wherein the UE establishes a first session in a first area by using the first anchor UPF network element, wherein the source intermediate SMF network element provides a service for the UE after the UE moves from the first area to a second area, and wherein the target intermediate SMF network element provides a service for the UE after the UE moves from the second area to a third area.

19. The apparatus according to claim 7, wherein the plurality of anchor UPF network element comprises a first anchor UPF network element managed by the anchor SMF network element and a second anchor UPF network element managed by the source intermediate SMF network element, and wherein the UE establishes a first session in a first area by using the first anchor UPF network element, wherein the source intermediate SMF network element provides a service for the UE after the UE moves from the first area to a second area, and wherein the target intermediate SMF network element provides a service for the UE after the UE moves from the second area to a third area.

20. The non-transitory, computer-readable medium according to claim 13, wherein the plurality of anchor UPF network element comprises a first anchor UPF network element managed by the anchor SMF network element and a second anchor UPF network element managed by the source intermediate SMF network element, and wherein the UE establishes a first session in a first area by using the first anchor UPF network element, wherein the source intermediate SMF network element provides a service for the UE after the UE moves from the first area to a second area, and wherein the target intermediate SMF network element provides a service for the UE after the UE moves from the second area to a third area.

* * * * *